(12) United States Patent
Jackson et al.

(10) Patent No.: US 12,289,279 B2
(45) Date of Patent: *Apr. 29, 2025

(54) MACHINE LEARNING TECHNIQUES FOR OPTIMIZED COMMUNICATION WITH USERS OF A SOFTWARE APPLICATION

(71) Applicant: Dexcom, Inc., San Diego, CA (US)

(72) Inventors: Andrea J. Jackson, Solana Beach, CA (US); Subrai Girish Pai, San Diego, CA (US); Mark Derdzinski, Pittsburgh, PA (US); Maritza S. Powell, San Diego, CA (US); Joost Herman Van Der Linden, San Diego, CA (US); Jessica S. Larrabee, San Diego, CA (US)

(73) Assignee: Dexcom, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,898

(22) Filed: Oct. 17, 2023

(65) Prior Publication Data
US 2024/0048516 A1 Feb. 8, 2024

Related U.S. Application Data

(63) Continuation of application No. 17/931,531, filed on Sep. 12, 2022, now Pat. No. 11,831,594.
(Continued)

(51) Int. Cl.
*H04L 51/214* (2022.01)
*G06Q 30/0201* (2023.01)
*G06Q 30/0251* (2023.01)

(52) U.S. Cl.
CPC ....... *H04L 51/214* (2022.05); *G06Q 30/0201* (2013.01); *G06Q 30/0264* (2013.01); *G06Q 30/0271* (2013.01)

(58) Field of Classification Search
CPC .......... G06Q 30/0201; G06Q 30/0271; G06Q 30/0264
See application file for complete search history.

(56) References Cited

U.S. PATENT DOCUMENTS 6,931,327 B2   8/2005  Goode, Jr. et al.
7,310,544 B2  12/2007  Brister et al.
(Continued)

OTHER PUBLICATIONS

International Search Report and Written Opinion for Application No. PCT/US2022/076315, mailed Oct. 27, 2022, 20 pages.

*Primary Examiner* — Barbara B Anyan
(74) *Attorney, Agent, or Firm* — Patterson + Sheridan, LLP

(57) ABSTRACT

Certain aspects of the present disclosure relate to methods and systems for optimized delivery of communications including content to users of a software application. The method also includes obtaining, by a customer engagement platform (CEP), a set of cohort selection criteria for identifying a user cohort to deliver the content; identifying, by a data analytics platform (DAP), the user cohort to communicate with in accordance with the set of cohort selection criteria; identifying, by the DAP, one or more communication configurations for communicating with one or more sub-groups within the user cohort; and to each user of the user cohort, transmitting one or more communications based on the content and a corresponding communication configuration for a sub-group that may include the corresponding user; and measuring engagement outcomes associated with usage of the corresponding one or more communication configurations in communication with each of the sub-groups.

20 Claims, 8 Drawing Sheets

Related U.S. Application Data

(60) Provisional application No. 63/244,069, filed on Sep. 14, 2021.

(56) References Cited

U.S. PATENT DOCUMENTS

| | | |
|---|---|---|
| 9,445,445 B2 | 9/2016 | Miller et al. |
| 2005/0043598 A1 | 2/2005 | Goode et al. |
| 2005/0154271 A1 | 7/2005 | Rasdal et al. |
| 2005/0192557 A1 | 9/2005 | Brauker et al. |
| 2005/0203360 A1 | 9/2005 | Brauker et al. |
| 2006/0222566 A1 | 10/2006 | Brauker et al. |
| 2007/0016381 A1 | 1/2007 | Kamath et al. |
| 2007/0032706 A1 | 2/2007 | Kamath et al. |
| 2007/0203966 A1 | 8/2007 | Brauker et al. |
| 2007/0208245 A1 | 9/2007 | Brauker et al. |
| 2008/0033254 A1 | 2/2008 | Kamath et al. |
| 2013/0103462 A1 | 4/2013 | Carpenter et al. |
| 2014/0074589 A1* | 3/2014 | Nielsen ............ G06Q 30/0271 705/14.43 |
| 2014/0297395 A1* | 10/2014 | Chao ............... G06Q 30/0201 705/14.41 |
| 2015/0220942 A1* | 8/2015 | Dubberley ........ G06Q 30/0201 705/7.29 |
| 2016/0182720 A1* | 6/2016 | Kaiser ............ G06Q 30/0264 379/265.09 |
| 2017/0235894 A1 | 8/2017 | Cox et al. |
| 2019/0325996 A1* | 10/2019 | Yelpaala ............... G16H 10/60 |
| 2019/0336053 A1 | 11/2019 | Halac et al. |

* cited by examiner

MACHINE LEARNING TECHNIQUES FOR OPTIMIZED COMMUNICATION WITH USERS OF A SOFTWARE APPLICATION

CROSS-REFERENCE TO RELATED APPLICATIONS

This application is a continuation of U.S. patent application Ser. No. 17/931,531, filed Sep. 12, 2022, which claims priority to and benefit of U.S. Provisional Patent Application No. 63/244,069, filed on Sep. 14, 2021, which is incorporated by reference herein in its entirety.

BACKGROUND

Field of Disclosure

This application relates generally to enabling optimized communication with users of software applications, such as software applications that enable user interaction with medical devices (e.g., as analyte sensors) and provide decision support guidance to a patient, a caregiver, a healthcare provider, or another user in order to help with improving the patient's health.

Description of the Related Technology

Many software applications interface with users via, for example, communications that are provided to the users to enhance user engagement with the software application even when the users are not actively using the software application. As a result, operating systems for many computing devices (e.g., smartphone devices, smart tablet devices, personal computer devices, and the like) enable the software applications deployed on such computing devices to send communications to the users of the noted computing devices. Accordingly, users of such computing devices being flooded with a large amount of communications transmitted by such software applications. The large amount of such communications presents resource usage efficiency challenges for the computing devices. For example, when a user of a computing device receives a large amount of communications, the user is likely to ignore such communications, which, in many environments, causes the communications to be stored on the random access memory of the computing device for a long period of time, often until the user selects the communication, manually erases the communication, or restarts the computing device. As a result of the delayed engagement with or erasure of communications, during the period in which a communication originating from a software application is presented to the user of the computing device, the computing device is operating in a suboptimal execution mode because the communication is not yet removed from the random access memory. As such, a part of the random access memory resources of the computing device that could have been used to enhance execution speed of the computing device, are allocated to idle presentation of communications.

Accordingly, suboptimal user engagement with communications originating from software applications can present challenges for efficient usage of random access memory resources of computing devices.

Moreover, suboptimal user engagement with software application communications also leads to higher user attrition rates for many software applications, including software applications used to interact with medical devices in order to facilitate effective management of health, diseases, and conditions. As an example, to assist patients with better managing their health conditions, portable or wearable medical devices (e.g., sensors and other types of monitoring and diagnostic devices) as well as a variety of health intervention software applications have been developed by various providers. However, these types of medical devices as well as applications, which generally execute on patients' mobile devices, may suffer from very high attrition rates in the early days, weeks, or months of use because of low user engagement. Examples of health-related applications may include intervention applications for supporting the treatment of various diseases (e.g., diabetes) as well as applications that help with improving a patient's health overall, such as weight loss applications.

This background is provided to introduce a brief context for the summary and detailed description that follow. This background is not intended to be an aid in determining the scope of the claimed subject matter nor be viewed as limiting the claimed subject matter to implementations that solve any or all of the disadvantages or problems presented above.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of optimized delivery of communications including content to users of a software application. The method also includes obtaining, by a customer engagement platform (CEP), a set of cohort selection criteria for identifying a user cohort to deliver the content; communicating, by the CEP, the set of cohort selection criteria to a data analytics platform (DAP); identifying, by the DAP, the user cohort to communicate with in accordance with the set of cohort selection criteria; identifying, by the DAP, one or more communication configurations for communicating with one or more sub-groups within the user cohort; and providing, by the DAP, an indication of the one or more communication configurations for communicating with each of the one or more sub-groups. The method also includes to each user of the user cohort, transmitting one or more communications, where the one or more communications that are transmitted to a corresponding user are determined based on the content and a corresponding communication configuration for a sub-group that may include the corresponding user; and measuring engagement outcomes associated with usage of the corresponding one or more communication configurations in communication with each of the sub-groups. Other embodiments of this aspect include corresponding computer systems, apparatus, and computer programs recorded on one or more computer storage devices, each configured to perform the actions of the methods.

Implementations may include one or more of the following features. The method where: each user of the user cohort is associated with a set of feature values, and each sub-group is defined by one or more feature value ranges and may include each user of the user cohort whose set of feature values correspond to the one or more feature value ranges for the sub-group.

Identifying the one or more communication configurations may include: Identifying the user cohort may include: for each user of the software application, generating a set of criterion satisfaction indicators for the user with respect to the set of cohort selection criteria; determining that each in the user cohort has a corresponding set of criterion satisfaction indicators that satisfy the set of cohort selection criteria. Generating the set of criterion satisfaction indicators for each user in relation to the set of cohort selection criteria: identifying operational input data associated with the user, where the operational input data may include application usage pattern data for the user in relation to the software application; and generating, based on the operational input data, and using a criterion satisfaction determination machine learning model, at least one of the set of criterion satisfaction indicators.

Identifying the one or more sub-groups of the user cohort may include: generating, based on an exploration ratio defined by the DAP: (i) an exploration subset of the user cohort, and (ii) an exploitation subset of the user cohort; identifying, based on a reward function for the one or more communication configurations, an optimal communication configuration from the one or more communication configurations and one or more non-optimal communication configurations from the one or more communication configurations; and for each communication configuration, identifying an allocated user subset of the user cohort, where: (i) the allocated user subset for the optimal communication configuration may include each user in the exploitation subset, (ii) the allocated user subset for each one of the one or more non-optimal communication configurations may include each user in the exploration subset that is randomly allocated to the non-optimal communication configuration using a random user allocation mechanism, and (iii) the identified one or more sub-groups may include the allocated user subsets identified for the one or more communication configurations. The method may include, subsequent to measuring the engagement outcomes, updating the reward function based on the engagement outcomes. The exploration ratio may be determined based on a number of historical updates of the reward function. The exploration ratio may be set to zero if the number of historical updates satisfies a threshold number.

Identifying the one or more sub-groups of the user cohort may include: identifying a sub-group allocation policy, where: (i) the sub-group allocation policy is a machine learning model that is generated in accordance with expected reward measures defined by a reward function, and (ii) the reward function relates input contextual data for a given user to the expected reward measures for the given user across the one or more corresponding communication configurations; and for each user in the user cohort, generating, by the DAP, based on the input contextual data for the user, and using the sub-group allocation policy, an allocated communication configuration of the one or more communication configurations, where each of the one or more identified sub-groups corresponds to one of the one or more communication configurations and may include a subset of users in the user cohort whose allocated communication configurations is the corresponding communication configuration. The method may include, subsequent to measuring the engagement outcomes, updating the reward function based on the engagement outcomes.

Identifying the one or more sub-groups of the user cohort may include: identifying a sub-group allocation policy, where: (i) the sub-group allocation policy is a machine learning model that is generated in accordance with expected reward measures defined by a reward function, and (ii) the reward function relates an input contextual state for a given user to the expected reward measures for the given user across one or more actions, where each of the one or more actions corresponds to one of the one or more corresponding communication configurations; and for each user in the user cohort, generating, by the DAP, based on the input contextual state for the user, and using the sub-group allocation policy, an allocated action for the user, an allocated action of the one or more actions, where each of the one or more identified sub-groups corresponds to one of the one or more actions and may include a subset of users in the user cohort whose allocated action is the corresponding action. The method may include, subsequent to measuring the engagement outcomes, updating the reward function based on the engagement outcomes.

Each one of the one or more corresponding communication configurations may be defined by a respective one of one or more communication settings, and each one of the one or more communication settings is defined by a distinct communication frequency.

Each one of the one or more corresponding communication configurations is defined by a respective one of one or more communication settings, and each one of the one or more communication settings is defined by a distinct communication format for a distinct communication medium. Implementations of the described techniques may include hardware, a method or process, or computer software on a computer-accessible medium.

Another general aspect includes a computing system for optimized delivery of communications including content to users of a software application. The computing system also includes a memory may include executable instructions. The system also includes a processor in data communication with the memory and configured to execute the instructions to cause the computing system to: obtain, by a customer engagement platform (CEP), a set of cohort selection criteria for identifying a user cohort to deliver the content; communicate, by the CEP, the set of cohort selection criteria to a data analytics platform (DAP); identify, by the DAP, the user cohort to communicate with in accordance with the set of cohort selection criteria; identify, by the DAP, one or more communication configurations for communicating with one or more sub-groups within the user cohort; provide, by the DAP, an indication of the one or more communication configurations for communicating with each of the one or more sub-groups; to each user of the user cohort, transmit one or more communications, where the one or more communications that are transmitted to a corresponding user are determined based on the content and a corresponding communication configuration for a sub-group that may include the corresponding user; and measure engagement outcomes associated with usage of the corresponding one or more communication configurations in communication with each of the sub-groups.

Other embodiments of this aspect include corresponding computer systems, apparatus, and computer programs recorded on one or more computer storage devices, each configured to perform the actions of the methods.

DETAILED DESCRIPTION

Figure 1A:
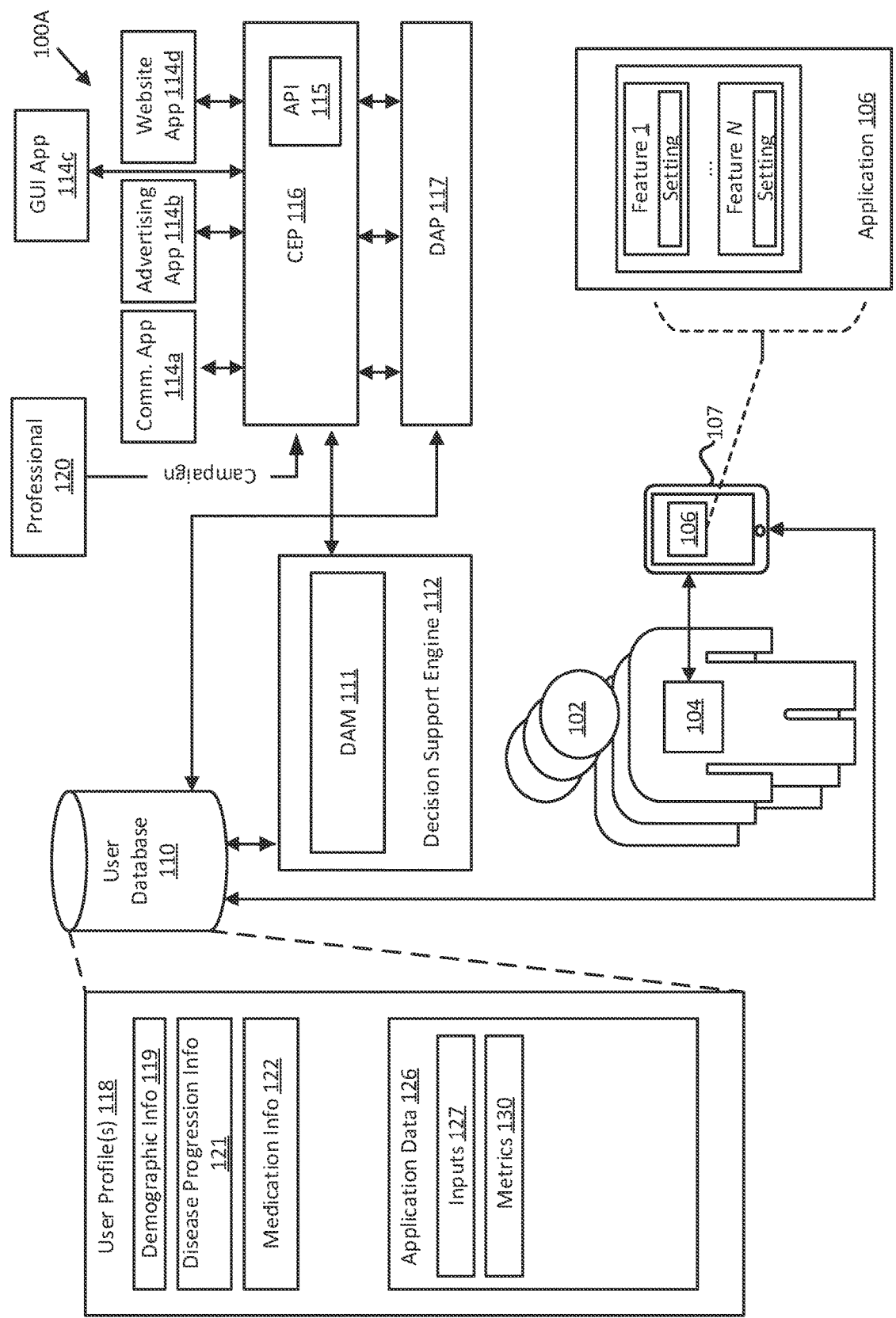
FIG. 1A illustrates an example health monitoring and support system, according to some embodiments disclosed herein.

Portable and/or wearable health monitoring devices (also referred to herein as "health monitoring devices") and mobile health applications (also referred to herein as "applications"), have rapidly become renowned for their capabilities to support user-centered care. The wide dissemination of these health monitoring devices and the increase in the development and distribution of mobile health applications has improved health management, and more specifically chronic disease management, in the healthcare domain. In particular, the use of mobile health applications in conjunction with these health monitoring devices, represents a more scalable and potentially more cost effective alternative to traditional interventions, offering a means of improving health and chronic disease management by expanding the reach of healthcare services and improving users' access to health-related information and interventions.

Mobile health applications enable users to be much more involved in the users' own medical care by granting them access to and control over their health information, which results in better patient satisfaction, and improvement in care and clinical outcomes. In particular, mobile health applications enable users to access, monitor, record, and update their health information regardless of physical constraints, such as time and location. Commercially available mobile health applications provide functions such as delivering health information, medication reminders, remote monitoring, and mobile analytics to increase a users' health literacy, encourage users to play a more active role in managing their health or disease, promote adherence to treatment, and other types of decision support guidance.

In particular, a variety of intervention applications have been developed by various providers to deliver guidance that may assist patients, caregivers, healthcare providers, or other users in improving lifestyle or clinical/patient outcomes by meeting a variety of challenges, such as analyte control, exercise, and/or other health factors. The term "analyte" as used herein refers without limitation to a substance or chemical constituent in the body or a biological sample. For example, diabetes intervention applications have been developed to assist patients, caregivers, healthcare providers, or other users in overnight glucose control (e.g., reduce incidence of hypoglycemic events or hyperglycemic excursions), glucose control during and after meals (e.g. use historical information and trends to increase glycemic control), hyperglycemia corrections (e.g., increase time in target zone while avoiding hypoglycemic events from over-correction), and/or hypoglycemia treatments (e.g., address hypoglycemia while avoiding "rebound" hyperglycemia), to name a few.

A large number of mobile health applications provide such assistance in some form of guidance to the user. For example, guidance may include a graphical summary of a user's data over time or a mobile notification to the user, where the notification is offered to inform, warn, and/or recommend some action to the user. As an example, the application may help a user respond to a health condition in real time by predicting events or trends and provide treatment recommendations to address occurring or potential events or trends in real time. This type of calculated guidance and support may relieve the cognitive burden on the user. Some mobile health applications may also allow data to be exported in various formats to be shared with third parties and/or to connect users directly with healthcare professionals for feedback, which may support an improved patient-professional dialogue. Thus, if utilized, mobile health applications may increase quality of care while at the same time offering the potential to reduce costs for healthcare systems.

Health monitoring devices enable real-time sensing and analysis of human physiological information for medical monitoring of various diseases and conditions, noninvasive medical care and administration of various therapies and medicine, and mobile health and wellness monitoring. Portability is a central feature of these health monitoring devices. Thus, where continuously utilized, these devices may provide many benefits including improved information access, reduced medical errors, improved quality of care, etc.

To be an effective support tool, it is desirable for the health monitoring device and/or application to continuously, or frequently, capture the attention of users and to stimulate the users' interest to actively engage with the device and/or application. Engagement indicates the degree of interaction a user has with the technology, e.g., device and/or application. Because health technologies, including health monitoring and mobile health applications, are voluntary use systems, the extent of user engagement with these technologies and applications is generally determined by the users' perceived quality of experience, ongoing benefit of usage, and/or consideration of viable alternatives to using the technology.

As discussed, unfortunately, health monitoring systems, including health monitoring devices and/or mobile health applications, designed to support the management of chronic diseases or health conditions have been plagued with low user engagement. In some cases, user engagement and retention associated with health monitoring and support systems are negatively affected by factors such as a lack of motivation or commitment by a user to change health behaviors. In some other cases, after users attain some knowledge by using an application or a health monitoring device, the user's interest in using the application or the device is reduced. In yet other examples, a user may experience low engagement due to repeated technical failure of the user's health monitoring device. Further, in other cases, the low engagement/retention rate associated with health monitoring and support systems may stem from the incorrect use of the application or device. One concrete example of this is when the mobile health application is configured to provide notifications or alerts to the user with a frequency that is much higher than what the user expects or needs, resulting in fatigue and loss of interest in the application. Another example, if when the health monitoring system is not correctly worn, causing it to repeatedly fall off.

While initial adoption of a device and/or application is related to the cost of exploring the device and/or application to develop perceptions of compatibility or visibility, long-term engagement is primarily driven by rational considerations, including benefits offered by the device and/or application (e.g., relative advantage) and the ability of users to recognize these benefits (e.g., result demonstrability). Thus, users may become attracted to the availability of new technology; however, this attractiveness may be short-lived unless a user develops patterns or practices of using the device and/or application to realize its relative benefits, e.g., with respect to managing their health condition.

Engagement with health monitoring and support systems is a dynamic process that includes multiple stages, namely: point of engagement, period of engagement, disengagement, and re-engagement. Therefore, user engagement is multi-faceted in nature and may change within short or longer periods of time. In other words, what appears as an optimal client engagement solution today may not necessarily work tomorrow, a week later, or many months down the road. Thus, in some cases, approaches to engage users that are static and not tailored or personalized based on a user's specific objectives and behaviors (which transform over time) may also contribute to the low user engagement experienced by health monitoring devices and mobile health applications. For example, a user may download an application on the user's mobile device with the intention of achieving certain objectives. However, after only days of use, the user may decide that the features presented by the application are not very relevant to the user in that the features are not useful to the user in meeting any of the user's specific objectives. As a result, the user may lose interest in the application and drop its usage all together. In another example, a user may initially use the application on a regular basis but as the patient's condition, objectives, preferences, and/or behavior change over time, the application may begin to feel irrelevant and useless to the user, resulting in the user losing interest in the application.

According to recent statistics, more than two-thirds of users who downloaded a mobile health application used it only once before ceasing use. The low engagement (and retention) rate is a critical issue given the nature of chronic diseases, for which most mobile health applications are designed. The lack of engagement prevalent in mobile health applications, and similarly, health monitoring devices, can have devastating results. In particular, a user who forgoes engaging with a health monitoring device and/or mobile health application configured to stabilize a chronic condition of the user may fail to manage the condition outside of the technology's use. Where the condition is left unmanaged for too long, the users' condition may significantly deteriorate, additional health issues may arise, and, in some cases, lead to an increased risk or likelihood of mortality.

To move from initial adoption to sustained use, companies and/or application developers often develop customer engagement strategies to increase user satisfaction by having more positive interactions with users of the device and/or application. However, many client engagement strategies suffer due to their static nature or inability to adapt to changing users and/or preferences, states, and characteristics of users using the technology. Thus, constant recalibration and personalization of customer engagement strategies is crucial to maximizing client engagement.

In addition, as described above, suboptimal user engagement with communications originating from software applications (e.g., health-related applications) can present challenges for efficient usage of random access memory resources of computing devices on which the applications are deployed. If a software application transmits communications in a manner that is configured to optimize user engagement with those communications, then the user of the software application is more likely to engage with the communications with minimal delay after the user notices the communications. Reducing this delay time means that the period of time in which the random access memory resources of the computing device are used for idle presentation of the communications, and hence the suboptimal random access memory usage period of the computing device, is reduced. Accordingly, techniques for optimizing user engagement with communications originating from software applications, such as various techniques described herein, enable more efficient usage of random access memory resources by computing devices on which the noted software applications are deployed and in turn increase execution speed of the noted computing devices.

Another technological advantage resulting from more optimized delivery of communications from software applications includes increasing effective usage of those software applications by users, which in turn leads to the software applications being more effective in accomplishing the objectives of the software applications. For example, software applications used to interact with portable and/or wearable health monitoring devices in order to facilitate user health management can be more effective and enable more effective user health management if the noted software applications transmit communications in a manner that is configured to optimize user engagement with the noted communications, as further described below.

Certain embodiments described herein provide a technical solution to the technical problems described above (including random access memory usage problems and user attrition problems) by introducing a customer engagement platform (CEP) designed to increase user engagement among various cohorts of users using a health monitoring device, including a continuous analyte sensor, and/or a mobile health application that is, for example, in communication with the continuous analyte sensor.

The CEP refers to a communication platform for communicating with a cohort of one or more users with the goal of optimizing engagement among such cohorts. In certain embodiments, the CEP includes or is in communication with a data analytics platform (DAP) that provides analytics (e.g., application and/or user analytics) for identifying the appropriate user cohort for communication and determining communication configurations that are then used to interact or communicate with the cohort. Communication configurations include the "what" (e.g., the content) and the "how" (e.g., tone, tenor, medium, timing, frequency) of the communication that is sent to users. The DAP is configured to determine communication configurations that optimize engagement for different user cohorts, while also remaining fluid and adaptable to accommodate the ever-changing characteristics, preferences, behaviors, states, and conditions of users in a cohort. The term "cohort" as used herein defines a group of one or more users from a set of users of a software application who share certain one or more defining characteristics.

As an example, the CEP may be used in customer engagement marketing, which is the use of strategic, personalized content to increase engagement of users with, for example, a mobile health application or a health monitoring device. A campaign in customer engagement marketing may be designed for existing users of the device and/or application to increase user engagement, retention, loyalty, advocacy, and/or participation. As an example, a campaign may be defined to communicate with all Type I diabetes users, and/or caretakers, healthcare professionals, etc., of Type I diabetes users, using the application to inform them about a new feature of the application or a new product, that is especially useful to Type I diabetes users.

In certain embodiments, the CEP is designed to, either directly or through a communication application, provide an interface, e.g., for a marketing or customer engagement professional, to define a customer engagement campaign for communicating with a specific cohort of patients (interchangeably referred to herein as "users"). As an illustrative example, a professional may use the interface provided by the CEP to define a campaign with campaign criteria including a set of campaign configurations for a certain user cohort. The campaign configurations help identify the user cohort for which the campaign is defined. For example, the campaign configurations may include a certain health condition, e.g., Type I diabetes, and a certain age range, e.g., ages 50-70. Once a campaign is defined with the campaign configurations, a cohort of patients that matches the campaign configurations is then identified using the DAP. In the example above, the DAP is able to identify all Type I users within the age range of 50 to 70 years old as the right cohort to be communicated with.

The DAP may identify a user cohort based on the campaign configurations using a number of different models, such as rule-based models and machine learning models. Going back to the example above, when a campaign is defined with Type I and age range of 50-70 years old, as the campaign criteria, the DAP may access a user datastore to identify users whose profiles match the campaign criteria. For example, the DAP identifies all users in the datastore who have Type I diabetes and are within the ages of 50-70 years old. In a different example, the customer engagement professional may indicate an interest in communicating with users who are experiencing alert fatigue or users who are at the risk of churning. In such an example, the DAP may utilize one or more models, such as machine learning models, to identify such users, as described in more detail below.

In addition to identifying the cohort of users or "to whom" the communication is to be directed to, the DAP may further determine communication configurations, such as the "what" (e.g., the content) and the "how" (e.g., tone, tenor, medium, timing, frequency) of the communication that is to be provided to the identified user cohort. Content, tone, tenor, medium, timing, frequency, etc. of the communication may be referred to herein as communication configurations. In order to maximize user engagement associated with the communication, the DAP may select different communication configurations for different sub-groups of users within the identified cohort. In some cases, a sub-group may become as granular as one user. Utilizing different communication configurations for different users is advantageous because various sub-groups within the identified cohort may each respond differently (in terms of engagement) to different content, tone, tenor, medium, timing, frequency, of communication.

In certain embodiments, in order to determine what type of communication increases engagement for what cohort of users, in certain embodiments, the DAP uses a statistical model or approach referred to as a multi-armed bandits (MAB) approach. The term "multi-armed bandit" comes from a hypothetical experiment where an agent must choose between multiple; actions the multiple arms), each with an unknown payout. The goal is to select the action that maximizes gain. The MAB approach finds a balance between exploration and exploitation. Exploration allows an agent to improve its current knowledge about each action, while exploitation chooses the greedy action to get the most reward. Accordingly, in certain embodiments described herein, the DAP uses an MAB approach to both (1) explore to improve its current knowledge about each communication configuration applied to each cohort of users and the impact each communication configuration has with respect to engagement of each of cohort of users and (2) exploit such communication configurations determined to best promote user engagement among each cohort of users. The balance that the DAP may strike between exploration and exploitation depends on the bandit strategy or algorithm the DAP is configured with. There are a variety of different bandit algorithms that may be used (e.g., epsilon greedy, etc.). As described in further detail below, in certain embodiments, DAP may be configured with one of a variety of MAB models, including a non-contextual MAB model (e.g., shown in FIG. 4), a contextual MAB model (e.g., shown in FIG. 5), or a full reinforcement learning model (e.g., shown in FIG. 6), which can be considered a more complex form of a contextual MAB model.

In some embodiments, to identify sub-groups of a user cohort that is generated in accordance with a set of cohort selection criteria, the DAP performs an exploration-exploitation sub-group allocation routine that includes the following operations: (i) identifying a set of communication configurations (e.g., a set of predefined communication configurations), (ii) dividing the users in the user cohort into an exploration subset and an exploitation subset, and (iii) allocating, to each one of the identified communication configurations, a set of users from the exploration subset and a set of users from the exploitation subset. For example, in some embodiments: (i) if a given communication configuration is described by a reward function to be the most optimal communication configuration for the user cohort, then the given communication configuration is allocated all of the exploitation subset and none of the exploration subset, and (ii) if a given communication configuration is described by a reward function to not be the most optimal communication configuration for the user cohort, then the given communication configuration is allocated none of the exploitation subset and a randomly-selected share of the exploration subset. In other words, in accordance with the exploration-exploitation sub-group allocation techniques used in this exemplary embodiment, given C communication configurations, then C sub-groups are generated, where each one of the C sub-groups corresponds to one of the C communication configurations, the sub-group that corresponds to the most optimal communication configuration comprises all of the exploitation subset of the cohort users, and each one of the C−1 sub-groups that corresponds to one of the C−1 communication configurations other than the most optimal communication configurations comprises a randomly-allocated share of the exploration subset of the cohort users.

Accordingly, in some embodiments, generating sub-groups of a user cohort comprises: (i) identifying a set of communication configurations, (ii) identifying, based on a reward function for the one or more communication configurations, an optimal communication configuration from the one or more communication configurations and one or more non-optimal communication configurations from the one or more communication configurations, and (iii) for each communication configuration, identifying an allocated user subset of the users of the user cohort. In some embodiments, the identified one or more sub-groups comprise the allocated user subsets identified for the one or more communication configurations. In some embodiments, the allocated user subset for the optimal communication configuration comprises each user in the exploitation subset, while the allocated user subset for each one of the one or more non-optimal communication configurations comprises each user in the exploration subset that is randomly allocated to the non-optimal communication configuration using a random user allocation mechanism. In some embodiments, the optimal communication configuration is the communication configuration that is described by the reward function as likely to generate maximal user engagement relative to other communication configurations.

In some embodiments, the size of the exploration subset of the user cohort and the size of the exploitation subset of the user cohort are determined based on an exploration ratio that describes what ratio of the user cohort should be allocated to the exploration subset and thus used for exploring the communication configuration space in order to update the reward function. For example, in some embodiments, the exploration ratio may be fifty percent, meaning that the exploration ratio would require that half of the users of the user cohort are allocated to the exploration subset and half of the users of the user cohort are allocated to the exploitation subset. In some embodiments, the exploration ratio is determined based on a number of historical updates of the reward function, such that as the reward function gets more updated, the exploration ratio decreases. In some embodiments, after a threshold number of (e.g., ten) updates of the reward function, the exploration ratio is set to zero, such that all of the users of the user cohort are allocated to the optimal communication configuration as described by the updated reward function.

Once communication configurations for different sub-groups of an identified cohort are selected by the DAP, the DAP indicates the identified communication configurations to CEP. The CEP then, either directly or through some communication system or application (e.g., application 114a, application 106, or other applications 114), transmits the communications to each sub-group within the cohort using the corresponding communication configurations selected for the sub-groups. For example, communication application 114a may transmit or manage transmission of communications to different users through various methods (e.g., text, email, phone call, etc.).

The DAP then measures the engagement outcomes resulting from exploring the use of the selected communication configurations in relation to the various sub-groups within a cohort. Subsequently, for future rounds of communications sent to the cohort, DAP optimizes the selection of the communication configurations for the different sub-groups by exploiting the knowledge obtained from the measured engagement outcomes in the previous rounds while continuing to explore and learn about the user cohort. This cycle of exploration/exploitation is repeated over time, allowing DAP to identify optimal communication configurations for the user cohort in order to maximize engagement in an on-going basis.

According to embodiments described herein, the use of CEP is not limited to campaigns created by a marketing or customer engagement professional. For example, in some embodiments, the CEP may provide an interface (e.g., an application programming interface (API)) for various systems and software applications to increase engagement and/or personalize communication with a user cohort. In such examples, the CEP may similarly get assistance from the DAP as to which communication configurations should be used for which sub-group of users, thereby increasing the likelihood of user engagement for each sub-group of users with the software application or device. Such systems and software applications may include a messaging application, a decision support engine, an advertising application, a graphical user interface (GUI) application, a website design application, or the like. For example, a GUI application may use CEP, in conjunction with DAP, to determine optimal GUIs to use for a cohort of users ranging in ages from five years old to ten years old as compared to another cohort of users ranging in ages from fifty years old to sixty years old to achieve maximum engagement with the application among each cohort.

Note that, although the description and examples below are drawn to a glucose monitoring sensor capable of measuring the concentration of glucose in a host, the systems and methods of the embodiments described herein can be used in conjunction with any type of analyte sensor for any measurable analyte. The system and methods of the embodiment described herein may be used in conjunction with any health-related application that is provided to the user to improve the user's health. For example, a health-related application may help the user with treating a certain disease or just help with improving the health of a user who is not necessarily diagnosed with a disease.

Example System with a Customer Engagement Platform (CEP) and a Data Analytics Platform (DAP) for Increasing User Engagement FIG. 1A illustrates an example health monitoring and support system 100 for monitoring user health, providing decision support, and maximizing customer engagement among users associated with system 100, including user 102. Each user of system 100, such as user 102, interacts with a mobile health application, such as mobile health application ("application") 106 (e.g., a diabetes intervention application that provides decision support guidance), and/or a health monitoring device, such as analyte monitoring system 104. User 102 (hereinafter "the user"), in certain embodiments, may be the patient or, in some cases, the patient's caregiver. In the embodiments described herein, the user is assumed to be the patient for simplicity only, but is not so limited. As shown, system 100 includes analyte monitoring system 104, a mobile device 107 that executes application 106, a decision support engine 112, a user database 110, a CEP 116, a DAP 117, and one or more other applications 114 in communication with CEP 116.

Analyte monitoring system 104 is configured to generate analyte measurements for user 102, e.g., on a continuous basis, and transmit the analyte measurements to mobile device 107 for use by application 106. In some embodiments, analyte monitoring system 104 transmits the analyte measurements to mobile device 107 through a wireless connection (e.g., Bluetooth connection). In certain embodiments, mobile device 107 is a smart phone. However, in certain embodiments, mobile device 107 may instead be any other type of computing device such as a laptop computer, a smart watch, a tablet, or any other computing device capable of executing application 106.

Note that, while in certain examples the analyte monitoring system 104 is assumed to be a glucose monitoring system, analyte monitoring system 104 may operate to monitor one or more additional or alternative analytes. As discussed, the term "analyte" as used herein is a broad term, and is to be given its ordinary and customary meaning to a person of ordinary skill in the art (and is not to be limited to a special or customized meaning), and refers without limitation to a substance or chemical constituent in the body or a biological sample (e.g., bodily fluids, including, blood, serum, plasma, interstitial fluid, cerebral spinal fluid, lymph fluid, ocular fluid, saliva, oral fluid, urine, excretions, or exudates). Analytes can include naturally occurring substances, artificial substances, metabolites, and/or reaction products. In some embodiments, the analyte for measurement by the sensing regions, devices, and methods is albumin, alkaline phosphatase, alanine transaminase, aspartate aminotransferase, bilirubin, blood urea nitrogen, calcium, CO2, chloride, creatinine, glucose, gamma-glutamyl transpeptidase, hematocrit, lactate, lactate dehydrogenase, magnesium, oxygen, pH, phosphorus, potassium, sodium, total protein, uric acid, metabolic markers, and drugs.

Other analytes are contemplated as well, including but not limited to acetaminophen, dopamine, ephedrine, terbutaline, ascorbate, uric acid, oxygen, d-amino acid oxidase, plasma amine oxidase, xanthine oxidase, NADPH oxidase, alcohol oxidase, alcohol dehydrogenase, pyruvate dehydrogenase, diols, Ros, NO, bilirubin, cholesterol, triglycerides, gentisic acid, ibuprophen, L-Dopa, methyl dopa, salicylates, tetracycline, tolazamide, tolbutamide, acarboxyprothrombin; acylcarnitine; adenine phosphoribosyl transferase; adenosine deaminase; albumin; alpha-fetoprotein; amino acid profiles (arginine (Krebs cycle), histidine/urocanic acid, homocysteine, phenylalanine/tyrosine, tryptophan); andrenostenedione; antipyrine; arabinitol enantiomers; arginase; benzoylecgonine (cocaine); biotinidase; biopterin; c-reactive protein; carnitine; carnosinase; CD4; ceruloplasmin; chenodeoxycholic acid; chloroquine; cholesterol; cholinesterase; conjugated 1-β hydroxy-cholic acid; cortisol; creatine kinase; creatine kinase MM isoenzyme; cyclosporin A; d-penicillamine; de-ethylchloroquine; dehydroepiandrosterone sulfate; DNA (acetylator polymorphism, alcohol dehydrogenase, alpha 1-antitrypsin, cystic fibrosis, Duchenne/Becker muscular dystrophy, glucose-6-phosphate dehydrogenase, hemoglobin A, hemoglobin S, hemoglobin C, hemoglobin D, hemoglobin E, hemoglobin F, D-Punjab, beta-thalassemia, hepatitis B virus, HCMV, HIV-1, HTLV-1, Leber hereditary optic neuropathy, MCAD, RNA, PKU, Plasmodium vivax, sexual differentiation, 21-deoxycortisol); desbutylhalofantrine; dihydropteridine reductase; diptheria/tetanus antitoxin; erythrocyte arginase; erythrocyte protoporphyrin; esterase D; fatty acids/acylglycines; free β-human chorionic gonadotropin; free erythrocyte porphyrin; free thyroxine (FT4); free tri-iodothyronine (FT3); fumarylacetoacetase; galactose/gal-1-phosphate; galactose-1-phosphate uridyltransferase; gentamicin; glucose-6-phosphate dehydrogenase; glutathione; glutathione perioxidase; glycocholic acid; glycosylated hemoglobin; halofantrine; hemoglobin variants; hexosaminidase A; human erythrocyte carbonic anhydrase I; 17-alpha-hydroxyprogesterone; hypoxanthine phosphoribosyl transferase; immunoreactive trypsin; lactate; lead; lipoproteins ((a), B/A-1, β); lysozyme; mefloquine; netilmicin; phenobarbitone; phenyloin; phytanic/pristanic acid; progesterone; prolactin; prolidase; purine nucleoside phosphorylase; quinine; reverse tri-iodothyronine (rT3); selenium; serum pancreatic lipase; sissomicin; somatomedin C; specific antibodies (adenovirus, anti-nuclear antibody, anti-zeta antibody, arbovirus, Aujeszky's disease virus, dengue virus, Dracunculus medinensis, Echinococcus granulosus, Entamoeba histolytica, enterovirus, Giardia duodenalisa, Helicobacter pylori, hepatitis B virus, herpes virus, HIV-1, IgE (atopic disease), influenza virus, Leishmania donovani, leptospira, measles/mumps/rubella, Mycobacterium leprae, Mycoplasma pneumoniae, Myoglobin, Onchocerca volvulus, parainfluenza virus, Plasmodium falciparum, poliovirus, Pseudomonas aeruginosa, respiratory syncytial virus, rickettsia (scrub typhus), Schistosoma mansoni, Toxoplasma gondii, Trepenoma pallidium, Trypanosoma cruzi/rangeli, vesicular stomatis virus, Wuchereria bancrofti, yellow fever virus); specific antigens (hepatitis B virus, HIV-1); succinylacetone; sulfadoxine; theophylline; thyrotropin (TSH); thyroxine (T4); thyroxine-binding globulin; trace elements; transferrin; UDP-galactose-4-epimerase; urea; uroporphyrinogen I synthase; vitamin A; white blood cells; and zinc protoporphyrin. Salts, sugar, protein, fat, vitamins, and hormones naturally occurring in blood or interstitial fluids can also constitute analytes in certain embodiments.

The analyte can be naturally present in the biological fluid, for example, a metabolic product, a hormone, an antigen, an antibody, and the like. Alternatively, the analyte can be introduced into the body, for example, a contrast agent for imaging, a radioisotope, a chemical agent, a fluorocarbon-based synthetic blood, or a drug or pharmaceutical composition, including but not limited to insulin; ethanol; cannabis (marijuana, tetrahydrocannabinol, hashish); inhalants (nitrous oxide, amyl nitrite, butyl nitrite, chlorohydrocarbons, hydrocarbons); cocaine (crack cocaine); stimulants (amphetamines, methamphetamines, Ritalin, Cylert, Preludin, Didrex, PreState, Voranil, Sandrex, Plegine); depressants (barbituates, methaqualone, tranquilizers such as Valium, Librium, Miltown, Serax, Equanil, Tranxene); hallucinogens (phencyclidine, lysergic acid, mescaline, peyote, psilocybin); narcotics (heroin, codeine, morphine, opium, meperidine, Percocet, Percodan, Tussionex, Fentanyl, Darvon, Talwin, Lomotil); designer drugs (analogs of fentanyl, meperidine, amphetamines, methamphetamines, and phencyclidine, for example, Ecstasy); anabolic steroids; and nicotine. The metabolic products of drugs and pharmaceutical compositions are also contemplated analytes. Analytes such as neurochemicals and other chemicals generated within the body can also be analyzed, such as, for example, ascorbic acid, uric acid, dopamine, noradrenaline, 3-methoxytyramine (3MT), 3,4-dihydroxyphenylacetic acid (DOPAC), homovanillic acid (HVA), 5-hydroxytryptamine (5HT), histamine, Advanced Glycation End Products (AGEs) and 5-hydroxyindoleacetic acid (FHIAA).

Application 106 is a mobile health application that is configured to receive and analyze analyte measurements from analyte monitoring system 104. In particular, application 106 stores the analyte measurements in a user profile 118 of user 102 for processing and analysis as well as for use by the decision support engine 112 to provide decision support recommendations or guidance to user 102. Application 106 may include a set of features 1-N, where N is an integer greater than one and is meant to indicate that application 106 may have any number of features. One or more of the features 1-N are configured to provide a form of guidance to user 102 to support user 102 in making more informed decisions (e.g., about management of their health condition).

A feature may interact with user 102 through various ways such as text, email, notifications (e.g., push notifications), phone calls, and/or other forms of communication such as displaying content (e.g., graphs, trends, charts, etc.) on the user interface of application 106. In certain embodiments, each feature includes a setting that defines the operations of the feature. Accordingly, changing a feature's setting results in changing the way the feature operates, such as the way the feature provides guidance and interacts with the user. For example, changing a feature's setting may result in one or more of, among other things, changing the medium of communication (e.g., text, notification, call, etc.) as well as frequency, content, timing, the form of the guidance provided by the feature and the guidance's timeframe (e.g., guidance can be real-time or retrospective/reflective), etc.

As an illustrative example, features 1-N of application 106 may include a number of different exercise management features. For instance, features 1, 2, 3, and 4 of application 106 may correspond to exercise management feature 1 (e.g., a reminder feature for reminding the user about exercising at certain times), exercise management feature 2 (e.g., an exercise recommendation feature that recommends different types of exercise based on information relating to the user), exercise management feature 3 (e.g., a feature that calculates for how long the user should exercise to reach a certain blood glucose level), and exercise management feature 4 (e.g., a feature that recommends walking routes/hiking trails, etc.), respectively. Further, in certain embodiments, an exercise management feature can be configured with a number of settings. As an example, exercise management feature 1 may configured with one of five settings (e.g., settings A, B, C, D, and E), where each setting configures exercise management feature 1 to provide guidance to the user with a different one or more of frequency, content, timing, form, time-frame, etc. For example, setting A may be the least aggressive or interactive (e.g., fewer reminders, different content, etc.) while setting E may be the most interactive.

In some embodiments, each different communication setting is associated with a distinct communication frequency. For example, a first communication setting may transmit communications twice a day, while a second communication setting may transmit communications three times a day. In some embodiments, each different communication setting is associated with a distinct communication device and comprises operations required to transmit content data using the appropriate data format of the respective communication device that is associated with the communication setting. For example, a first communication setting may comprise operations required to transmit content data over a telephonic medium, while a second communication setting may comprise operations required to transmit content data over a computer network medium, such as over an Internet medium.

In certain embodiments, decision support engine 112 refers to a set of software instructions with one or more software modules, including a data analysis module (DAM) 111. In some embodiments, decision support engine 112 executes entirely on one or more computing devices in a private or a public cloud. In some other embodiments, decision support engine 112 executes partially on one or more local devices, such as mobile device 107, and partially on one or more computing devices in a private or a public cloud. In some other embodiments, decision support engine 112 executes entirely on one or more local devices, such as mobile device 107.

As discussed in more detail herein, decision support engine 112, may provide decision support recommendations to user 102 via CEP 116 and/or application 106. Decision support engine 112 determines decision support recommendations based on information included in the user profile 118 that is stored in user database 110. User profile 118 may include information collected about the user from application 106, as further described below.

In certain embodiments, DAM 111 of decision support engine 112 is configured to process a set of inputs 127 (described in more detail below) to determine one or more metrics 130 that may then be used by decision support engine 112 to provide decision support recommendations to user 102. Inputs 127 may be stored in user profile 118 in user database 110. DAM 111 can fetch inputs 127 from user database 110 and compute a plurality of metrics 130 which can then be stored as application data 126 in user profile 118.

Such metrics 130 may include behavioral metrics and/or health-related metrics. Metrics 130, discussed in more detail below with respect to FIG. 2, may, at least in some cases, be indicative of the health or state of user 102, such as one or more of the physiological or psychological state of user 102 (e.g., stress level, happiness, etc.), trends associated with the health or state of user 102, etc. Further, in some cases, metrics 130 may be indicative of the behaviors and habits of user 102, such as one or more of user 102's behavior or interaction with respect to application 106, the behavior of user 102 with respect to the treatment of the disease, health-related behaviors, etc.

In certain embodiments, application 106 is configured to take as input information relating to user 102 and store the information in a user profile 118 for user 102 in user database 110. For example, application 106 may obtain and record user 102's demographic info 119, disease progression info 121, and/or medication info 122 in user profile 118. In certain embodiments, demographic info 119 may include one or more of the user's age, body mass index (BMI), ethnicity, gender, etc. In certain embodiments, disease progression info 121 may include information about the user 102's disease, such as, for diabetes, whether the user is Type I, Type II, pre-diabetes, or whether the user has gestational diabetes. In certain embodiments, disease progression info 121 also includes the length of time since diagnosis, the level of disease control, level of compliance with disease management therapy, predicted pancreatic function, other types of diagnosis (e.g., heart disease, obesity) or measures of health (e.g., heart rate, exercise, stress, sleep, etc.), and/or the like. In certain embodiments, medication regimen info 122 may include information about the amount and type of medication taken by user 102, such as insulin or non-insulin diabetes medications and/or non-diabetes medication taken by user 102.

In certain embodiments, application 106 may obtain demographic info 119, disease progression info 121, and/or medication info 122 from user 102 in the form of user input or from other sources. In certain embodiments, as some of this information changes, application 106 may receive updates from user 102 or from other sources. In certain embodiments, user profile 118 associated with user 102, as well as other user profiles associated with other users are stored in a user database 110, which is accessible to application 106, as well as to decision support engine 112 and DAP 117, over one or more networks (not shown). In certain embodiments, application 106 collects inputs 127 through user 102 input and/or a plurality of other sources, including analyte monitoring system 104, other applications running on mobile device 107, and/or one or more other sensors and devices. In certain embodiments, such sensors and devices include one or more of, but are not limited to, an insulin pump, other types of analyte sensors, sensors or devices provided by mobile device 107 (e.g., accelerometer, camera, global positioning system (GPS), heart rate monitor, etc.) or other user accessories (e.g., a smart watch), or any other sensors or devices that provide relevant information about user 102. In certain embodiments, user profile 118 also stores application configuration information indicating the current configuration of application 106, including its features and settings.

User database 110, in some embodiments, refers to a storage server that may operate in a public or private cloud. Database 110 may be implemented as any type of datastore, such as relational databases, non-relational databases, key-value datastores, file systems including hierarchical file systems, and the like. In some exemplary implementations, database 110 is distributed. For example, database 110 may comprise a plurality of persistent storage devices, which are distributed. Furthermore, database 110 may be replicated so that the storage devices are geographically dispersed.

User database 110 includes other user profiles 118 associated with a plurality of other users served by health monitoring and decision support system 100. More particularly, similar to the operations performed with respect to the user 102, the operations performed with respect to these other users may utilize an analyte monitoring system, such as analyte monitoring system 104, and also interact with the same application 106, copies of which execute on the respective mobile devices of the other users 102. For such users, user profiles 118 are similarly created and stored in user database 110. As described above, in order to increase engagement among these users, the health monitoring and decision support system 100 includes CEP 116 and DAP 117.

CEP 116 is a communication and customer engagement platform that allows for increasing engagement among the users of health monitoring and decision support system 100. In certain embodiments, CEP provides a platform for defining customer engagement campaigns. Such campaigns may include marketing campaigns, advertising campaigns, feature education campaigns, and other campaigns for communication with users that could benefit from higher user engagement. These campaigns may be described in more detail below with respect to FIG. 3.

As an example, in certain embodiments, a marketing or customer engagement professional 120 uses CEP 116 as a platform to define a campaign with a set of campaign criteria to increase engagement among a certain user cohort. The campaign criteria may indicate the user cohort that the campaign is directed to. As an illustrative example, professional 120 may wish to create a feature education campaign to increase engagement among male diabetic users of application 106 by informing such users about a new feature of application 106. In such an example, professional 120 may use a user interface provided by, for example, a communication application 114a for interacting with CEP 116 and creating the campaign. The user interface may provide various options for filtering users. For example, to create the campaign the professional may, for example, select "male" and "diabetic" as the campaign criteria on the user interface. As further described below, the campaign criteria is then communicated by the CEP 116 to DAP 117, which identifies users whose profiles meet the campaign criteria (i.e., users that fall into the cohort defined by professional 120). As an example, DAP 117 may use a query to database 110 to retrieve user IDs of all users that are recorded to be male and diabetic.

In addition to the campaign criteria, in some embodiments, professional 120 may also define a set of communication configurations around the communication that is to be provided to the user cohort. For example, professional 120 may use the user interface provided by CEP 116 to further select one of many options relating to the tone, tenor, and content of the messaging (e.g., informal messaging, formal messaging, messaging using pictures, etc.), the timing and frequency of the communication, the means of communications (e.g., text, email, phone call, notification through application 106, etc.), etc. Once a set of communication configurations are identified by professional 120, CEP 116 transmits the communication to the identified cohort with the identified one or more sets of communication configurations.

However, in certain embodiments, professional 120 does not define the communication configurations. For example, the professional 120 may not know which communication configuration (e.g., which "tone") resonates with the majority of defined user cohort. In another example, various users or user sub-groups within a user cohort may resonate or respond to different communication configurations. Therefore, one set of communication configurations may increase engagement among one group of, e.g., male diabetic users and a second set of communication configurations may increase engagement among a second group of male diabetic users.

In embodiments where the communication configurations are not defined or selected by professional 120, in addition to indicating the campaign criteria to DAP 117 to identify users who meet the campaign criteria, CEP 116 also sends a request to DAP 117 to select communication configurations to be used for communicating with the identified user cohort or a number of sub-groups thereof. As further described below, the communication configurations are then selected by DAP 117 to maximize a measure of expected user engagement among the identified user cohort or the sub-groups therein. Once a set of communication configurations are identified, CEP 116 transmits the communication to the identified cohort with the identified one or more sets of communication configurations.

Moving now to DAP 117, DAP 117 is an analytics platform that provides various capabilities for performing analysis on voluminous, complex, and dynamic data, and more specifically in this context, the user profiles 118 stored in user database 110 and/or one or more other data stores. More specifically, DAP 117 performs at least two main functions. First, DAP 117 is configured to analyze data from database 110 to identify a cohort of users 102 for communication based on the campaign criteria communicated to DAP 117 by CEP 116. In the example above, DAP 117 accesses database 110 to identify users that are "male" and "diabetic" in accordance with the campaign criteria input into CEP 116. Second, DAP 117 is configured to analyze data from database 110 in order to determine one or more communication configurations for communicating with the identified cohort with the goal of maximizing engagement among the cohort or the various sub-groups thereof.

To perform the first function, in certain embodiments, DAP 117 may be configured with logic to identify one or more users that meet certain campaign criteria. For instance, in the example above, DAP 117 may sort through user profiles 118 from user database 110 and identify users that are both male and have a diabetic condition. In some embodiments, DAP 117 may send a query to database 110 that examines demographic info 119 of each user profile in user database 110 to determine which users 102 are male. Further, the query may examine disease progression info 121 of user profiles of the identified male users to identify users who are both male and diabetic. For each user profile, if the demographic info 119 indicates that the user is male and the disease progression info 121 indicates that the user is diabetic, then the user is identified as meeting the campaign criteria and, therefore, a member of the desired cohort.

In certain embodiments, determining whether a user 102 meets certain campaign criteria may require more complex analysis by DAP 117. For example, in some cases, campaigns may be defined for addressing users who are experiencing technical or engagement issues, such as alert fatigue, churn, sensor failure, etc. In such cases, identifying users that are alert fatigued or churning, etc., may not be as simple as sending a database query to database 110 (unless previous analysis has been done and reflected by the user profiles). For example, where a campaign is defined for addressing users 102 of application 106 that are experiencing or at risk of churn, user profiles 118 for the users may not identify the level of churn in advance. Such information may need to be determined or predicted by DAP 117 by analyzing information in the users' profiles.

Accordingly, in certain embodiments, DAP 117 may be configured with one or more machine learning models that are trained to determine or predict whether a user meets certain campaign criteria, such as for campaigns around alert fatigue, churn, and sensor failure, etc. For example, in the case of churn, DAP may utilize machine learning models that that are configured to take a set of inputs (e.g., application usage patterns, device usage patterns, lack of engagement patterns, and the like from the user profile of each user) and predict a level of churn or a risk of each user churning. The use of machine learning models for identifying users and/or cohorts of users 102 for a campaign is described in further detail with respect to FIG. 3.

In addition to identifying a user cohort for communication, in certain embodiments, DAP 117 is further configured to perform the function of identifying one or more communication configurations for communicating with the identified cohort with the goal of maximizing engagement among the cohort. As described in more detail below, in some embodiments, DAP 117 may be configured to use a statistical model, such as a MAB model, to identify communication configurations that maximize engagement. In some embodiments, DAP 117 uses a non-contextual MAB model (e.g., shown in FIG. 4), a contextual MAB model (e.g., shown in FIG. 5), or a full reinforcement learning model (e.g., shown in FIG. 6). For example, DAP 117 may use the non-contextual MAB model to initially explore which communication configurations result in the highest level of user engagement among a cohort and use or exploit those configurations for communication with the majority of the identified cohort for future communications. More particularly, in certain embodiments, in the initial rounds of campaign communications, DAP 117 may use a non-contextual MAB model to determine which communication configuration yields the highest user engagement out of all communication configurations based on engagement data collected as a result of one or more rounds of communications for the campaign. As discussed, example of different communication configurations may be three different communication mediums (e.g., text, call, and notification) or four different communication tones (e.g., "motivating," "neutral," etc.), etc.

Having identified the communication configuration that yields the highest engagement, DAP 117 may then continue to utilize that communication configuration in the following campaign communication for the majority of the user cohort (e.g., a sub-group that constitutes 90% of the cohort). For the rest of the user cohort, DAP 117 may use some of the other communication configurations in order to keep experimenting with the other configurations. As an example, DAP 117 may use the second best communication configuration for half of the remaining users in the cohort (e.g., 5% of the cohort) and the third best communication configuration for the other half of the remaining users in the cohort (e.g., the last 5% of the cohort).

A non-contextual MAB model does not take context or any observation associated with the user into account when predicting the likelihood of user engagement associated with different communication configurations. On the other hand, a contextual MAB model which may be implemented using a machine learning model, such as a supervised leaning model, takes contextual information associated with users of a cohort into account to determine communication configurations that have the highest likelihood of user engagement among one or more sub-groups of the cohort. For example, a variety of contextual features may be defined for categorizing users of a cohort into distinct sub-groups, each corresponding to a different set of one or more contexts. As an example, one or more contextual features such as age, sex, glucose condition (e.g., poor, average, good, etc.) disease progression information, etc. may be defined. Using these contextual features, the users in a cohort may fall into different sub-groups, each corresponding to a different set of contexts (e.g., Type 1 male users above the age of 60). The sub-groups may become more granular as more contextual features are used. The input into a model for each sub-group is therefore contextual information that indicate the context associated with the users of the cohort.

When machine learning is used for implementing a contextual MAB model, an agent is trained over time to predict communication configurations that will result in the highest user engagement for each sub-group based on the corresponding context associated with the sub-group. Instead of a contextual MAB model, in certain embodiments, a full reinforcement learning model may be used. A reinforcement learning model is a more complex extension of a contextual bandit model, where reinforcement learning model takes into account a user's state (e.g., current health condition, current state of engagement, etc.) in a certain environment when determining optimal communication configurations for communicating with the user. The different MAB models are described in further detail below.

In addition to providing a user interface for a professional 120 to create campaigns through communication application 114a, CEP 116 also provides an application programming interface (API) 115 that allows various software applications and systems to customize their communication with various users with the goal of increasing engagement. For example, advertising application 114b, GUI application 114c, website application 114d, and decision support engine 112 may provide CEP 116 with a certain set of possible communication configurations in order to determine which communication configuration should be used for the majority of the cohort or a user or a sub-group of a certain cohort. In certain embodiments, through API 115, applications 114b-114d may interface with CEP 116 by automatically defining campaigns, similar to how a professional 120 is able to manually define a campaign using different campaign and communication criteria.

As an example, advertising application 114b may define a campaign by providing three different communication configurations (i.e., different types of advertisement) to CEP 116 for communication with a certain user cohort. CEP 116 may then communicate these different communication configurations to DAP 117, which may determine which communication configuration has the highest likelihood of engaging the majority of the cohort or which communication configuration should be used for which sub-group of the user cohort. In such an example, by using CEP 116, and by extension DAP 117, advertising application 114b is able to communicate the right type of advertisement to the right audience (i.e., sub-group), thereby achieving increased engagement within each sub-group. GUI application 114c and website application 114d may utilize CEP 116 in a similar manner.

For each of applications 114b, 114c, and 114d, or similar applications that define a certain user cohort for communication, in order to determine optimal communication configurations, DAP 117 may use one of the MAB models discussed above. In addition to applications 114b-114d, or similar applications, decision support engine 112 may similarly use CEP 116 to customize communication and increase engagement with each user to which decision support is provided. For example, each feature of application 106 may have multiple settings, each setting corresponding to a different communication configuration for providing decision support to a user. An example of a communication configuration, as discussed above, is tone, tenor, timing, medium, etc. For example, an exercise management feature may have different settings for timing (e.g., (1) sending a notification at 8 am to remind the user to exercise, (2) sending a notification at 6 pm to remind the user to exercise, . . . ). These different settings may be communicated with CEP 116, which in turn communicates them to DAP 117. In order to determine which communication setting results in the most engagement, DAP 117 may utilize a contextual MAB or a full reinforcement learning model that takes into account contextual information about the user as input. For example, different contextual features may be defined for representing context or contextual state of the user at any time. Many of the metrics 130, shown in FIG. 2, may be used as contextual features to determine the context or contextual state the user is in and predict the communication configuration that will result in the highest amount of engagement, as further described in relation to FIG. 7.

Figure 1B:
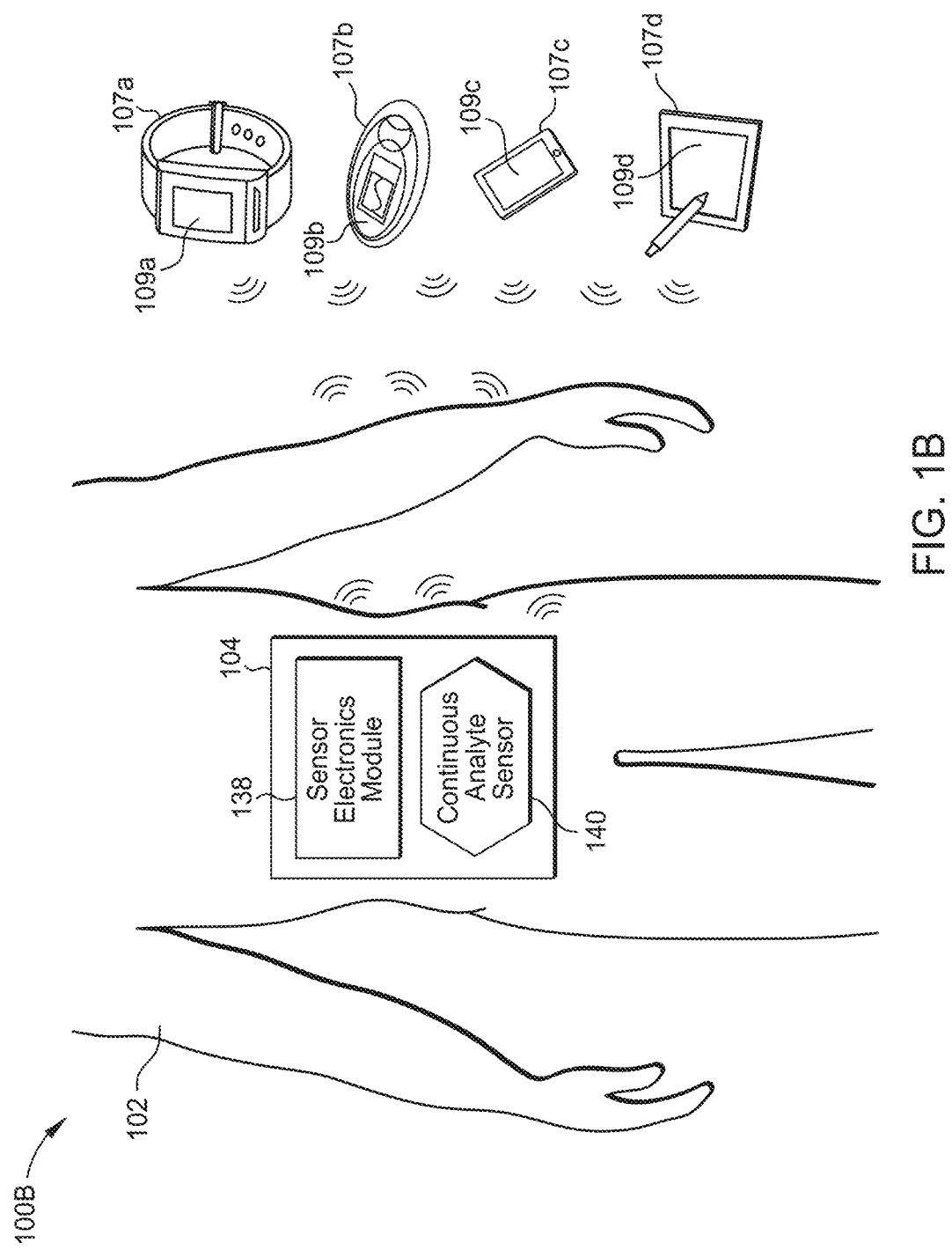
FIG. 1B illustrates the continuous analyte monitoring system of FIG. 1A, in more detail, along with a number of mobile devices, according to certain embodiments disclosed herein.

FIG. 1B illustrates an example of analyte monitoring system 104. In the example of FIG. 1B, analyte monitoring system 104 is a glucose monitoring system. However, as described above, analyte monitoring system 104 may be configured for measuring any other analytes or a combination of multiple analytes. FIG. 1B illustrates a number of mobile devices 107a, 107b, 107c, and 107d (individually referred to as mobile device 107 and collectively referred to as mobile devices 107). Note that mobile device 107 of FIG. 1A may be any one of mobile devices 107a, 107b, 107c, or 107d. In other words, any one of mobile devices 107a, 107b, 107c, or 107d may be configured to execute application 106. Glucose monitoring system 104 may be communicatively coupled to mobile devices 107a, 107b, 107c, and/or 107d.

By way of an overview and an example, glucose monitoring system 104 may be implemented as an encapsulated microcontroller that makes sensor measurements, generates analyte data (e.g., by calculating values for continuous glucose monitoring data), and engages in wireless communications (e.g., via Bluetooth and/or other wireless protocols) to send such data to remote devices, such as mobile devices 107. Paragraphs [0137]-[0140] and FIGS. 3A, 3B, and 4 of U.S. Patent Application Publication No. 2019/0336053 further describe an on-skin sensor assembly that, in certain embodiments, may be used in connection with glucose monitoring system 104. Paragraphs [0137]-[0140] and FIGS. 3A, 3B, and 4 of U.S. Patent Application Publication No. 2019/0336053 are incorporated herein by reference.

In certain embodiments, glucose monitoring system 104 includes an analyte sensor electronics module 138 and a glucose sensor 140 associated with analyte sensor electronics module 138. In certain embodiments, analyte sensor electronics module 138 includes electronic circuitry associated with measuring and processing analyte sensor data or information, including algorithms associated with processing and/or calibration of the analyte sensor data/information. Analyte sensor electronics module 138 may be physically/mechanically connected to glucose sensor 140 and can be integral with (i.e., non-releasably attached to) or releasably attachable to glucose sensor 140.

Analyte sensor electronics module 138 may also be electrically coupled to glucose sensor 140, such that the components may be electromechanically coupled to one another. Analyte sensor electronics module 138 may include hardware, firmware, and/or software that enable measurement and/or estimation of levels of the analyte in the user via glucose sensor 140 (e.g., which may be/include a glucose sensor). For example, analyte sensor electronics module 138 can include one or more potentiostats, a power source for providing power to glucose sensor 140, other components useful for signal processing and data storage, and a telemetry module for transmitting data from the sensor electronics module to one or more display devices. Electronics can be affixed to a printed circuit board (PCB) within glucose monitoring system 104, or platform or the like, and can take a variety of forms. For example, the electronics can take the form of an integrated circuit (IC), such as an Application-Specific Integrated Circuit (ASIC), a microcontroller, a processor, and/or a state machine.

Analyte sensor electronics module 138 may include sensor electronics that are configured to process sensor information, such as sensor data, and generate transformed sensor data and displayable sensor information. Examples of systems and methods for processing sensor analyte data are described in more detail herein and in U.S. Pat. Nos. 7,310,544 and 6,931,327 and U.S. Patent Application Publication Nos. 2005/0043598, 2007/0032706, 2007/0016381, 2008/0033254, 2005/0203360, 2005/0154271, 2005/0192557, 2006/0222566, 2007/0203966 and 2007/0208245, all of which are incorporated herein by reference in their entireties.

Glucose sensor 140 is configured to measure a concentration or level of the analyte in the user 102. The term analyte is further defined by paragraph [0117] of U.S. App. No. 2019/0336053. Paragraph [0117] of U.S. App. No. 2019/0336053 is incorporated herein by reference. In some embodiments, glucose sensor 140 comprises a continuous glucose sensor, such as a subcutaneous, transdermal (e.g., transcutaneous), or intravascular device. In some embodiments, glucose sensor 140 can analyze a plurality of intermittent blood samples. Glucose sensor 140 can use any method of glucose-measurement, including enzymatic, chemical, physical, electrochemical, spectrophotometric, polarimetric, calorimetric, iontophoretic, radiometric, immunochemical, and the like. Additional details relating to a continuous glucose sensor are provided in paragraphs [0072]-[0076] of U.S. Pat. No. 9,445,445. Paragraphs [0072]-[0076] of U.S. Pat. No. 9,445,445 are incorporated herein by reference.

With further reference to FIG. 1B, mobile devices 107 can be configured for displaying (and/or alarming) displayable sensor information that may be transmitted by sensor electronics module 138 (e.g., in a customized data package that is transmitted to the display devices based on their respective preferences). Each of mobile devices 107a, 107b, 107c, and/or 107d may respectively include a display such as touchscreen display 109a, 109b, 109c, and/or 109d for displaying a graphical user interface (e.g., of application 106) for presenting sensor information and/or analyte data to user 102 and/or receiving inputs from user 102. In certain embodiments, the mobile devices may include other types of user interfaces such as voice user interface instead of or in addition to a touchscreen display for communicating sensor information to user 102 of the mobile device and/or receiving user inputs. In certain embodiments, one, some, or all of mobile devices 107 may be configured to display or otherwise communicate the sensor information as it is communicated from sensor electronics module 138 (e.g., in a data package that is transmitted to respective display devices), without any additional prospective processing required for calibration and/or real-time display of the sensor data.

The mobile devices 107 may include a custom or proprietary display device, for example, analyte display device 107b, especially designed for displaying certain types of displayable sensor information associated with analyte data received from sensor electronics module 138 (e.g., a numerical value and/or an arrow, in certain embodiments). In certain embodiments, one of the mobile devices 107 includes a mobile phone, such as a smartphone that uses an Android, iOS, or another operating system configured to display a graphical representation of the continuous sensor data (e.g., including current and/or historic data).

Figure 2:
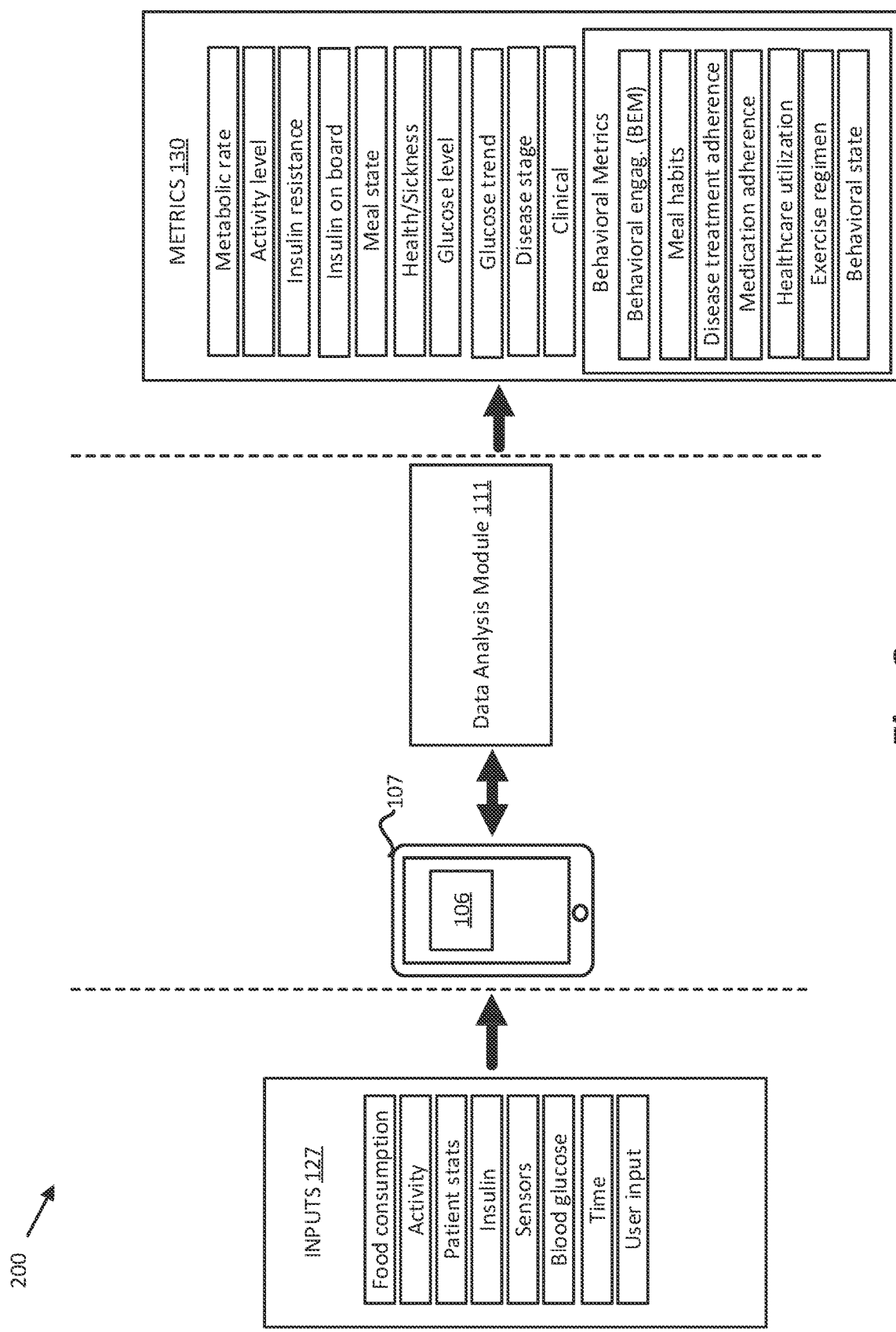
FIG. 2 illustrates example inputs and example metrics that are generated based on the inputs for use by the system of FIG. 1A, according to certain embodiments disclosed herein.

FIG. 2 provides a more detailed illustration of example inputs and example metrics that are determined based on the inputs, in accordance with certain embodiments described herein. FIG. 2 illustrates example inputs 127 on the left, application 106 and DAM 111 in the middle, and metrics 130 on the right. Application 106 obtains inputs 127 through one or more channels (e.g., manual user input, sensors, other applications executing on mobile device 107, etc.). Inputs 127 may be further processed by DAM 111 to output a plurality of metrics, such as metrics 130, which may similarly be used by features 1-N of application 106 to provide guidance to the user. In certain embodiments, inputs 127 and metrics 130 may also be used as contextual information by DAP 117 to (1) identify a cohort and/or define various sub-groups within a user cohort and/or (2) identify one or more communications configurations for communicating with the identified cohort or the sub-groups therein to increase engagement.

Any of inputs 127 may be used for computing any of metrics 130. In certain embodiments, each one of metrics 130 may correspond to one or more values, e.g., discrete numerical values, ranges, or qualitative values (high/medium/low or stable/unstable).

In certain embodiments, inputs 127 include food consumption information. Food consumption information may include information about one or more of meals, snacks, and/or beverages, such as one or more of the size, content (carbohydrate, fat, protein, etc.), sequence of consumption, and time of consumption. In certain embodiments, food consumption may be provided by the user through manual entry, by providing a photograph through an application that is configured to recognize food types and quantities, and/or by scanning a bar code or menu. In various examples, meal size may be manually entered as one or more of calories, quantity ('three cookies'), menu items ('Royale with Cheese'), and/or food exchanges (1 fruit, 1 dairy). In some examples, meals may also be entered with the user's typical items or combinations for this time or context (e.g., workday breakfast at home, weekend brunch at restaurant). In some examples, meal information may be received via a convenient user interface provided by application 106.

In certain embodiments, inputs 127 include activity information. Activity information may be provided, for example, by an accelerometer sensor on a wearable device such as a watch, fitness tracker, and/or patch. In certain embodiments, activity information may also be provided through manual input by user 102.

In certain embodiments, inputs 127 include patient statistics, such as one or more of age, height, weight, body mass index, body composition (e.g., % body fat), stature, build, or other information. Patient statistics may be provided through a user interface, by interfacing with an electronic source such as an electronic medical record, and/or from measurement devices. The measurement devices may include one or more of a wireless, e.g., Bluetooth-enabled, weight scale and/or camera, which may, for example, communicate with the mobile device 107 to provide patient data.

In certain embodiments, inputs 127 include information relating to the user's insulin delivery. Such information may be received, via a wireless connection on a smart pen, via user input, and/or from an insulin pump. Insulin delivery information may include one or more of insulin volume, time of delivery, etc. Other configurations, such as insulin action time or duration of insulin action, may also be received as inputs.

In certain embodiments, inputs 127 include information received from sensors, such as physiologic sensors, which may detect one or more of heart rate, respiration, oxygen saturation, body temperature, etc. (e.g., to detect illness).

In certain embodiments, inputs 127 include glucose information. Such information may be provided as input, for example through glucose monitoring system 104. In certain embodiments, blood glucose information may be received from one or more of smart pill dispensers that track when the user takes medicine, a blood ketone meter, a laboratory-measured, or estimated A1C, other measures of long-term control, or sensors that measure peripheral neuropathy using tactile response, such as by using haptic features of a smartphone, or a specialty device.

In certain embodiments, inputs 127 include time, such as time of day, or time from a real-time clock.

As described above, in certain embodiments, DAM 111 determines or computes metrics 130 based on inputs 127 associated with user 102. An example list of metrics 130 is illustrated in FIG. 2. In certain embodiments, metrics 130 determined or computed by DAM 111 include metabolic rate. Metabolic rate is a metric that may indicate or include a basal metabolic rate (e.g., energy consumed at rest) and/or an active metabolism, e.g., energy consumed by activity, such as exercise or exertion. In some examples, basal metabolic rate and active metabolism may be tracked as separate metric. In certain embodiments, the metabolic rate may be calculated by DAM 111 based on one or more of inputs 127, such as one or more of activity information, sensor input, time, user input, etc.

In certain embodiments, metrics 130 determined or computed by DAM 111 include an activity level metric. The activity level metric may indicate a level of activity of the user. In certain embodiments, the activity level metric be determined, for example based on input from an activity sensor or other physiologic sensors. In certain embodiments, the activity level metric may be calculated by DAM 111 based on one or more of inputs 210, such as one or more of activity information, sensor input, time, user input, etc.

In certain embodiments, metrics 130 determined or computed by DAM 111 include an insulin sensitive metric. The insulin sensitivity metric may be determined using historical data, real-time data, or a combination thereof, and may, for example, be based upon one or more inputs 127, such as one or more of food consumption information, blood glucose information, insulin delivery information, the resulting glucose levels, etc. In certain embodiments, the insulin on board metric may be determined using insulin delivery information, and/or known or learned (e.g. from patient data) insulin time action profiles, which may account for both basal metabolic rate (e.g., update of insulin to maintain operation of the body) and insulin usage driven by activity or food consumption.

In certain embodiments, metrics 130 determined or computed by DAM 111 include a meal state metric. The meal state metric may indicate the state the user is in with respect to food consumption. For example, the meal state may indicate whether the user is in one of a fasting state, pre-meal state, eating state, post-meal response state, or stable state. In certain embodiments, the meal state may also indicate nourishment on board, e.g., meals, snacks, or beverages consumed, and may be determined, for example from food consumption information, time of meal information, and/or digestive rate information, which may be correlated to food type, quantity, and/or sequence (e.g., which food/beverage was eaten first).

In certain embodiments, metrics 130 determined or computed by DAM 111 include health and sickness metrics. Health and sickness metrics may be determined, for example, based on one or more of user input (e.g., pregnancy information or known sickness information), from physiologic sensors (e.g., temperature), activity sensors, or a combination thereof. In certain embodiments, based on the values of the health and sickness metrics, for example, the user's state may be defined as being one or more of healthy, ill, rested, or exhausted.

In certain embodiments, metrics 130 determined or computed by DAM 111 include glucose level metrics. Glucose level metrics may be determined from sensor information (e.g., blood glucose information obtained from glucose monitoring system 104). In some examples, a glucose level metric may also be determined, for example, based upon historical information about glucose levels in particular situations, e.g., given a combination of food consumption, insulin, and/or activity. In certain embodiments, a blood glucose trend may be determined based on the glucose level over a certain period of time.

In certain embodiments, metrics 130 determined or computed by DAM 111 include a disease stage. For example disease stages for Type II diabetics may include a pre-diabetic stage, an oral treatment stage, and a basal insulin treatment stage. In certain embodiments, degree of glycemic control (not shown) may also be determined as an outcome metric, and may be based, for example, on one or more of glucose levels, variation in glucose level, or insulin dosing patterns.

In certain embodiments, metrics 130 determined or computed by DAM 111 include clinical metrics. Clinical metrics generally indicate a clinical state a user is in with respect to one or more conditions of the user, such as diabetes. For example, in the case of diabetes, clinical metrics may be determined based on glycemic measurements, including one or more of A1c, trends in A1c, time in range, time spent below a threshold level, time spent above a threshold level, and/or other metrics derived from blood glucose values. In certain embodiments, clinical metrics may also include one or more of estimated A1c, glycemic variability, hypoglycemia, and/or health indicator (time magnitude out of target zone).

In certain embodiments, metrics 130 determined or computed by DAM 111 include behavioral engagement metrics (BEMs) and/or metrics relating to one or more of meal habits, disease treatment adherence, medication type and adherence, healthcare utilization, exercise regimen, behavioral state, etc.

In certain embodiments, user input, or lack thereof, may indicate the user's level of interest in a certain feature, message, setting, etc. of application 106. The level of interest may indicate how helpful the user believes the feature, message, setting, etc. of application 106 is in helping the user achieve their objectives. Such interest may provide insight on user engagement when different features, messages, settings, etc. of application 106 are used. For example, a low user interest may be recorded for a certain message where the user ignores a certain reminder of the message, does not input information that is requested by the message, indicates specifically that the user does not like a certain form of guidance or interaction provided by the message, etc. DAP 117 may use this information to determine that this message is not optimal for engaging with the user.

In certain embodiments, a behavioral engagement metric (BEM) indicates the level of engagement relating to interaction of a user with a feature, message, setting, etc. of application 106. BEM may be calculated for each feature, setting or communication configuration, or generally each communication provided with a certain communication configuration, etc. in application 106. In certain embodiments, a BEM associated with a certain set of one or more communication configurations, e.g., message content, tone, tenor, medium, and/or timing, may be calculated based on interaction of the user with application 106. For example, a BEM for a certain communication configuration may be calculated based on information such as one or more of the frequency with which the user interacts with application 106 after the decision support communication is provided with the certain communication configuration to the user, the frequency with which the user ignores decision support communication provided with the certain communication configuration, the average amount of time the user spends interacting with application 106 after the decision support communication is provided to the user with the certain communication configuration, etc. In some embodiments, the frequency with which the user interacts with application 106 or other time-related data points may be calculated based on, for example, an interaction log that keeps records of one or more times the user interacts with the application 106, the amount of time the user spends interacting with application 106, etc. In certain embodiments, a BEM calculated for application 106 may also take into account the consistency of the user's behavior towards application 106.

In certain embodiments, BEMs may also be based on meal habits, medication adherence, blood glucose data, etc., because these other metrics may be indicative of how engaged the user is with application 106. As an example, metrics relating to meal habits of the user may be taken into account to determine the user's BEM towards a diet management content provided by application 106. For example, if the user is not consuming the types of meals recommended by a decision support message sent to user 102 for the purpose of diet management, which can be determined based on food consumption information, then user 102's BEM towards diet management content may be lowered.

As discussed, BEMs included in user profile 118 and stored in user database 110, may be used by DAP 117 to (1) identify a cohort of users and/or define various sub-groups within the cohort and/or (2) identify one or more communications configurations for communicating with the identified cohort or sub-groups therein to increase engagement. In one example, DAP 117 may identify a cohort of users based on BEMs that are indicative of a level of engagement relating to interaction of each user 102 with application 106. For instance, contexts may be defined as "high behavioral engagement with respect to feature 1," "average behavioral engagement with respect to feature 1," and "low behavioral engagement with respect to feature 1." In another example, DAP 117 may use BEMs to determine a context for a single user in a similar manner. Based on the context a user or a sub-group of users are in, DAP 117 may then determine predict an optimal communication configurations for communicating with the user or user sub-group in order to increase their behavioral engagement.

Example Operations for User Engagement for Mobile Health Applications

Figure 3:
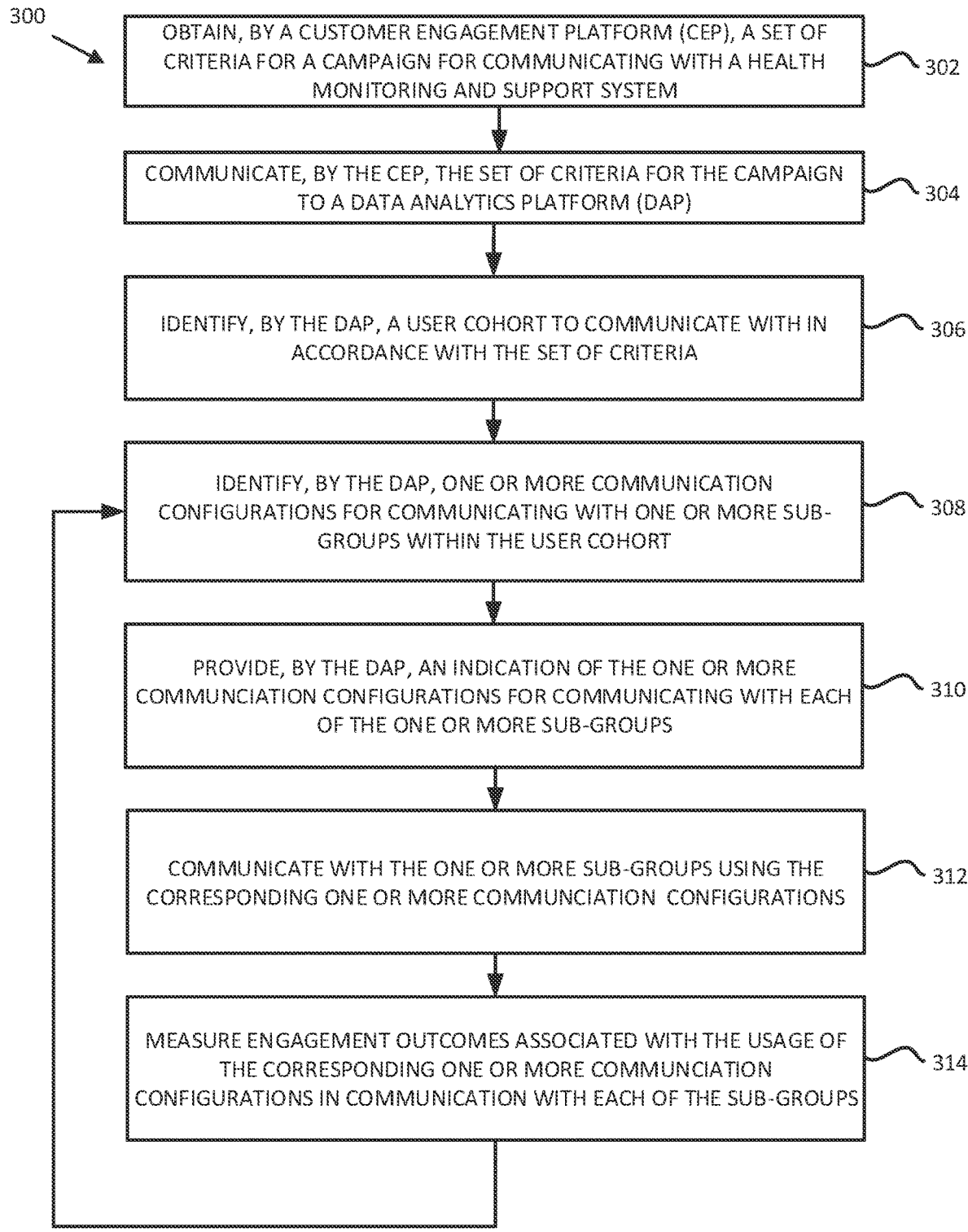
FIG. 3 is a flow diagram illustrating operations performed by a system, such as the health monitoring and support system of FIG. 1A, according to certain embodiments disclosed herein.

FIG. 3 is a flow diagram illustrating example operations 300 performed by a system (e.g., health monitoring and support system 100) for optimizing user engagement, according to certain embodiments disclosed herein. For example, operations 300 may be performed for optimizing user engagement with analyte monitoring system 104, application 106, software applications 114, and/or other components of health monitoring and support system 100 illustrated in FIG. 1A. Operations 300 are described below with reference to FIGS. 1A-1B and 2 and their components.

At block 302, operations 300 begin by obtaining a set of criteria for a campaign for communicating with one or more users associated with a health monitoring and support system, such as system 100 of FIG. 1A. Users associated with system 100, in some examples, refer to users of certain components of system 100, such as application 106, analyte monitoring system 104, etc. Block 302 may be performed by CEP 116, in some embodiments. In some embodiments, block 302 may be performed by a communication application 114a that provides a user interface for communicating with CEP 116.

Campaigns for communicating with one or more users of system 100 may take on various forms. For example, one campaign may be a transactional campaign. Transactional campaigns involve automated, time-sensitive communications that users 102 expect to receive while interacting with, for example, application 106. Such communication is usually triggered when a specific milestone or scenario occurs. Transactional campaigns are focused on specific, action-oriented objectives and communication. For example, transactional campaigns may involve communications that acknowledge a particular interaction by a user, such as meeting a time in range (TIR) goal, or messages that convey contextually personalized information, such as step/exercise goal reminders, weekly glucose summaries, etc.

As another example, a campaign may be a marketing campaign. A marketing campaign is an organized, strategized effort to promote a product or service. In the context of an application (e.g., application 106), in some examples, a marketing campaign may be used to promote or educate users 102 about one or more features of the application. As mentioned previously, a user 102 is more likely to continue to engage with an application if they see or are able to reap the benefits of using the application. Thus, to ensure a user is getting the most out of their application, it is important that they know about all the features an application has to offer. To inform users about features configured for the application, marketing communication, e.g., advertisements, may be used. Such marketing communication may inform the users about a setting or feature they did not have prior knowledge of, or a setting or feature they may not be using to its full potential. While it is important that the user learns about features of the application, feeding a large amount of information to the user at one time may not be the best approach. Thus, some marketing campaigns may be designed to educate the users about features of the application while also taking into consideration behaviors and/or preferences of each user to ensure maximum engagement between each user and the application.

Although most campaigns described herein may be categorized as either a transactional campaign or a marketing campaign, other campaigns and/or messaging/communication may be considered.

In certain embodiments, a professional 120 manually defines the set of campaign criteria. For example, professional 120 uses an interface provided by CEP 116, or a communication application 114a that is in communication with CEP 116, to define a set of campaign criteria. In the embodiments described herein, illustrative campaign examples may include (1) campaigns for addressing alert fatigue, (2) campaigns for addressing churn, and (3) campaigns for feature education for simplicity. However, as mentioned, campaigns are not limited to the examples provided herein.

In certain embodiments, the campaign criteria define parameters for identifying the user cohort that is going to be addressed by the campaign. For example, the campaign criteria may indicate that the campaign is configured to address Type I male users. In another example, the campaign criteria may indicate that the campaign is configured to address users that are alert fatigued, users that are at risk of churn, users that need education about a certain feature of an application, etc.

In some examples, CEP 116 or communication application 114a may provide a list of different user categories for a professional 120 to choose from to identify users as part of the cohort. For example, professional 120 may select from a plurality of options (in some cases, presented as checkboxes or in a drop down menu) "Condition: Type 2 Diabetes" "Age: 70+" and "Gender: Female". This selection defines the campaign criteria and indicates to CEP 116 that any communication associated with the campaign should be directed to only Type 2 diabetic, female users are who are above the age of 70. In such cases, the criteria is communicated by CEP 116 to DAP 117.

In certain embodiments, in addition to indicating "to whom" the communication should be directed, as part of the campaign criteria, the professional 120 may further define a plurality of communication configurations to be used for communicating with the user cohort. Communication configurations may indicate the "what" and the "how" of the communication that is to be transmitted to the user cohort. Communication configurations may include, but are not limited to, content of the communication, tone of the communication, tenor of the communication, medium of the communication, timing of the communication, frequency of the communication, a certain UI design (e.g., application or website UI) that should be used for the communication, etc. Thus, communication configurations may define multiple contents, tones, tenors, mediums, timings, frequencies, and/or designs.

In certain embodiments, professional 120 may not specifically instruct that a set of communication configurations be used for communication with the user cohort. In such embodiments, CEP 116 may obtain a pool of different configuration options from professional 120 or an application (e.g., applications 114 or 106) through an API. As further described in relation to block 308, DAP 117 may then identify which of the configuration options should be used for which users in the user cohort to maximize user engagement.

As an illustrative example, multiple configuration options (i.e., communication configurations) may be provided for the content of a message to be communicated to a user cohort. For example, the options may include messages with less formality including content such as "What's up", messages with neutral formality including content such as "Hello" or "Good morning", and messages with greater formality including content such as "Hello Mr. [Enter User's Name Here]. Hope you are having a good morning." Similarly, the campaign may define different tones, tenors, mediums, timings, and/or frequencies for communicating each of these different messages. To determine which of these communication configurations resonates more with the user cohort, as described in relation to block 308, DAP 117 may explore, over multiple rounds of campaign communications, the impact each of these different communication configurations have on user engagement and determine which configuration or set of configurations is optimal for the user cohort or each sub-group therein. Note that, at least in certain embodiments, each campaign involves transmission of multiple rounds of communications to a corresponding user cohort.

At block 304, operations 300 continue by CEP 116 providing the set of criteria for the campaign to DAP 117. As described with respect to FIG. 1A, CEP 116 may be in communication with DAP 117, and more specifically, provide an interface between DAP 117 and one or more software applications (e.g., applications 114, application 106), professional 120, one or more systems (e.g., decisions support engine 112), etc.

At block 306, operations 300 continue by DAP 117 identifying a user cohort from a pool of users in a user database (e.g., database 110) to communicate with in accordance with the set of criteria defined for the campaign. In order to identify a user cohort, DAP 117 identifies any users who meet the set of criteria defined for the campaign. In other words, the user cohort refers to all users who are identified by DAP 117 as having met the set of criteria defined for the campaign. A user cohort may include a single user or many users. In addition, not that any reference to a sub-group herein describes a group of one or more users. In other words, the granularity of how large the sub-groups of a cohort may be or how many sub-groups the cohort may vary.

In some embodiments, a cohort is a subset of users of a software application whose feature values correspond to contextual feature ranges defined by a set of campaign selection criteria (also referred to herein as "cohort selection criteria" or "criteria"). For example, in an exemplary embodiment, a set of campaign selection criteria may require that those users who are male and are between 50-70 years of age to be included in a cohort. In this example, the campaign selection criteria may define a contextual feature range of {TRUE} for a Boolean diabetes presence feature and a contextual feature range of [50, 70] for an age feature. Continuing with this example, if a first user is recorded to have a feature value of TRUE for the Boolean diabetes presence feature and a feature value of 65 for the age feature, then because the feature values of the first user correspond to the feature value ranges defined by the campaign selection criteria, then the first user is included in a cohort that is generated in accordance with the campaign selection criteria. However, if a second user is recorded to have a feature value of FALSE for the Boolean diabetes presence feature and/or is recorded to have a feature value of 45 for the age feature, then because the feature values of the second user do not correspond to the feature value ranges defined by the campaign selection criteria, the second user is not included in the cohort that is generated in accordance with the campaign selection criteria.

In some embodiments, given a set of N cohort selection criteria, to determine whether a particular user should be included in a user cohort that is to be generated in accordance with the N cohort selection criteria, the DAP: (i) generates N criterion satisfaction indicators for the particular user, where each one of the N cohort satisfaction indicators corresponds to one of the N cohort selection criteria, has an affirmative value if the feature values of the particular user correspond to the feature value range defined by the corresponding cohort selection criteria, and has a negative value otherwise, and (ii) includes the particular user in the user cohort if all of the N criterion satisfaction indicators for the particular user are affirmative criterion satisfaction indicators.

For example, consider a set of N=2 cohort selection criteria, where a first cohort selection criterion is satisfied by a user if the user has a TRUE value for a diabetes presence feature, and a second cohort selection criterion that is satisfied by a user if the user has a value for an age feature that falls within the range [50, 70]. In this example, if a user has a TRUE value for the diabetes presence feature and a value of 45 for the age feature, then the user has an affirmative criterion satisfaction indicator for the first cohort selection criterion but a negative criterion satisfaction indicator for the second cohort selection criterion. Continuing with this example, because one of the two criterion satisfaction indicators associated with the user is a negative criterion satisfaction indicator, the user will not be included in a user cohort generated in accordance with the set of N=2 cohort selection criteria.

As another example, consider a set of N=2 cohort selection criteria, where a first cohort selection criterion is satisfied by a user if the user has a TRUE value for a diabetes presence feature, and a second cohort selection criterion that is satisfied by a user if input data associated with the user (e.g., input data describing at least one of application usage patterns, device usage patterns, lack of engagement patterns, and the like) describes that the user has been experiencing fatigue. In some embodiments, given the described set of N=2 cohort selection criteria, a particular user is included in a corresponding user cohort if: (i) the diabetes presence feature value for the particular user describes a TRUE value, and (ii) the input data associated with the particular user indicates that the particular user is fatigued. As this example illustrates, in some embodiments, generating the criterion satisfaction indicator for a particular user in relation to a particular criterion comprises: (i) identifying operational input data associated with the particular user, wherein the operational input data comprises application usage pattern data for the particular user and the software system; and (ii) generating based on the operational input data the criterion satisfaction indicator for the particular user in relation to the particular criterion. In certain embodiments, the criterion satisfaction indicator is generated using a criterion satisfaction determination machine learning model. In some embodiments, a satisfaction determination machine learning model is associated with a corresponding cohort selection criterion and is trained to generate, based on input data associated with a user (e.g., input data describing at least one of application usage patterns, device usage patterns, lack of engagement patterns, and the like), an output that describes a predicted likelihood that the input data satisfies the cohort selection criterion.

In some embodiments, using the campaign criteria obtained from CEP 116, DAP 117 may identify users that fall into the user cohort. Continuing with the example above, DAP 117 may filter through each of the user profiles 118 stored in user database 110 to determine if the user profile indicates a Type 2 diabetic, female user who is above the age of 70. Users of user profiles that meet the campaign criteria are then selected as part of the user cohort.

In some embodiments, identifying whether a user meets the campaign criteria may require a more complex analysis by DAP 117. For example, a campaign may be defined to address all users who are experiencing alert fatigue or at risk of being alert fatigued as a result of alerts that are provided by application 106. In such an example, analyses may be performed in real-time or may have previously been performed by DAP 117 prior to the campaign being defined, to determine whether each user is experiencing alert fatigue or at risk of being alert fatigued. Such analyses may involve examining a variety of data points over time in order to predict or determine the risk or level of alert fatigue for each user. Therefore, although certain types of information (e.g., user's gender, age, etc.) may be simply indicated by their user profile 118, to determine whether a user is alert fatigued, churning, etc., may require analysis that may be performed by DAP 117 in an on-going basis or in response to some request, e.g., from CEP 116.

In addition to alert fatigue campaigns, further analysis may also be necessary by DAP 117 when identifying a user cohort for similar campaigns, such as a campaign for directing communication to users who have churned or at risk of churning as well as a campaign defined to educate users about a specific feature of an application, such as application 106. The following paragraphs describe embodiments relating to models and algorithms DAP 117 may utilize to determine whether (1) a user is alert fatigued or at risk of alert fatigue, (2) a user has churned or at risk of churning, and (3) a user belongs to a cohort that needs to be educated about a certain application feature.

Alert fatigue occurs when a user 102 is exposed to a large number of frequent alerts and consequently becomes desensitized to them. Desensitization can lead to longer response times or missing important alerts provided by an application, such as application 106. Alert fatigue is directly correlated to decreased user engagement. DAP 117 may determine whether or not a user is currently alert fatigued, a level of alert fatigue experienced by the user, and/or prior history of alert fatigue experienced by the user based on information collected about the user and recorded in the user profile 118. Such information may include, for example, (1) indications that affirm an alert was useful to the user, (2) indications that affirm an alert was not useful to the user, and (3) indications that the user is or has experienced certain fatigue prone situations that are assumed to cause alert fatigue (e.g., regardless of any information or indications about how the user may have reacted to those interactions).

For example, one or more types of fatigue causing situations that may be flagged as causing alert fatigue (e.g., regardless of any information or indications about how the user may react to those interactions) include hovering situations and situations where duplicate alerts are being communicated to the user from a variety of devices. Hovering situations, for example, may refer to situations where glucose levels of the user hover around a certain alert threshold, causing too many alerts to be sent to the user. For example, a user may create an alert setting through application 106 to alert the user when the user's glucose levels reach 90 mg/dl. However, the user may encounter many situations where the user's glucose levels may fluctuate very frequently around 88 mg/dl to 92 mg/dl, thereby causing application 106 to send an alert to the user every time the user's glucose levels reach the 90 mg/dl. Receiving too many alerts as a result of the user's glucose fluctuations around the alert threshold may, therefore, cause alert fatigue. In these situations, one possible solution for reducing the number of alerts is to change the alert threshold to, for example, 93 mg/dl. However, the user may not be aware of such a solution or may be hesitant to implement such a solution, hence the need for the user to be informed about this solution, for example, through a campaign.

In addition to hovering, duplicate alerts may similarly cause alert fatigue. For example, the user may interact with not only application 106, which receives glucose values from analyte monitoring system 104, but also another software application (e.g., an application associated with an insulin pump) executing on the user's mobile device 107 that similarly receives glucose values from analyte monitoring system 104, either directly or indirectly. In such an example, both application 106 and the other application may be configured to generate alerts when the user's glucose levels reach a certain threshold. Thus, in such an example, the user receives duplicate versions of the same alert, which may over time cause alert fatigue.

In some embodiments, (1) indications that affirm an alert was useful to the user and/or (2) indications that affirm an alert was not useful to the user are based on whether the user took any action to mitigate their glucose condition after receiving an alert. For example, where the user does not take any action in response to an alert, DAP 117 might consider such inaction as an indication that the user did not find the alert to be useful and that the user might be suffering from or at risk of fatigue. However, where the user does take action, DAP 117 might consider such action as an indication that the user found the alert to be useful and that the user is not (or at least, less) likely to be fatigued by such alerts.

For example, DAP 117 may determine that an alert is useful and not contributing (or less likely to contribute) to alert fatigue when a user administers an appropriate dose of bolus in response to the alert, goes for a walk in response to the alert, and/or the user's glucose levels stabilize (e.g., glucose levels return to a desired range or indicate a positive trend) in response to the alert. The opposite may be true where DAP 117 may determine that an alert is not useful and contributing (or more likely to contribute) to alert fatigue if the user does not administer an appropriate dose of bolus in response to the alert, does not go for a walk in response to the alert, and the user's glucose levels do not stabilize after the alert.

In some embodiments, (1) indications that affirm an alert was useful to the user and/or (2) indications that affirm an alert was not useful to the user are based on the user's interaction with application 106. For each alert communicated to the user, DAP 117 may assess whether the user acknowledged the alert (e.g., based on the user's interaction (e.g., input, etc.) with application 106), whether the user killed the application in response to the alert, whether the user powered off a mobile device where the application was executing, and/or if after a certain number of alerts communicated to the user, the user changed their setting for alert notification to reduce the number of alerts communicated to the user. Where the user fails to acknowledge an alert, kills the application, powers down a mobile device executing the application, or changes their settings to reduce the number of alerts, DAP 117 may determine the user is alert fatigued, as well as a level of alert fatigue associated with the user.

In some embodiments, to identify whether a user is fatigued or the level of the user's alert fatigue, each alert communicated by application 106 to the user may be assigned a fatigue score. Further, a fatigue budget may be assigned to each of a number of fatigue categories. A fatigue score indicates the severity of fatigue measured for each alert communicated to the user. The fatigue score for each alert may be based, at least in part, on the user's reaction to each alert, including whether the user took any action to mitigate the underlying cause of the alter and the user's interactions with application 106 in response to the alert, as described above. Additionally, a fatigue budget refers to a threshold amount of fatigue assigned to each fatigue category. The fatigue categories refer to different categories of situations or causes that may contribute to a user experiencing alert fatigue. For example, the different fatigue categories may include, a hovering category, a duplicate alert category, etc. When an alert is sent to a user, DAP 117 calculates a fatigue score and then adds the fatigue score to the running score in the category. For example, when an alert is sent to the user while the user is hovering around a certain glucose threshold, a fatigue score may be calculated and added to the hovering category's total running fatigue score. The total running fatigue score is the sum of all fatigue scores for the category over a certain period of time (e.g., past number of hours, days, etc.)

Where the user's total fatigue score for the specified period of time is greater than or equal to a fatigue budget (i.e., a certain threshold score) for the category, DAP 117 determines that the user is fatigued as a result of too many alerts being sent in that category. Accordingly, based on a total fatigue score in each category, DAP 117 may determine (or assume) a level of alert fatigue associated with the category.

In certain embodiments, in addition to a fatigue budget assigned to each fatigue category, a global fatigue budget is configured to identify fatigued users whose total fatigue score in each fatigue category is less than the corresponding fatigue budget, but whose sum of the total fatigue scores associated with all of the fatigue categories exceeds the configured global fatigue budget. In other words, DAP 117 may be configured to identify users who are not alert fatigued as a result of alerts associated with a particular category, but are still considered alert fatigued based, at least in part, on the combination of all the different categories of alerts being communicated to the user.

In certain embodiments, using the techniques described above, DAP 117 is configured to continuously, periodically, or in response to a request, determine whether each user with a corresponding profile in user database 110 is at risk of alert fatigue, alert fatigued, and/or determine the level of alert fatigue of the user based on the information that is stored in the corresponding user profile.

As described above, similar to alert fatigue, determining whether a user has churned or is at risk of churning may involve analysis performed by DAP 117 on information collected about a user over time and stored in the corresponding user profile 118. User churn generally refers to situations where a user has ceased all interaction with the application and has no intentions of using the application again. In turn, churn is directly correlated to decreased user engagement.

When it comes to user churn, DAP 117 may be configured to make various predictions in different embodiments. For example, in certain embodiments, DAP 117 may be configured to predict the likelihood of a currently active user churning in the future. In certain embodiments, an active user may be defined as a user who has been active or engaged with (e.g., uploaded information or provided some input into) application 106 during a certain time frame prior to when the churn analysis is being performed by DAP 117. In certain other embodiments, DAP 117 may be configured to predict the likelihood of a user who has already churned (e.g., an inactive user) to never return. In certain embodiments, an "inactive" user may be defined as a user who has not engaged with application 106 during a certain time frame prior to when the churn analysis is being performed by DAP 117. In some cases, inactive users may return to using application 106 after a period of time, e.g., a few days or a week, while in some other cases, inactive users may never return.

To predict the likelihood of a currently active user churning in the future, DAP 117 may use a machine learning model that is trained to recognize patterns between various information related to the user and likelihood of churning in the future. One of many machine learning techniques or algorithms (e.g., supervised learning algorithm, neural networks, etc.) may be used for training such a model using historical user data of many historical users. More specifically, the historical user data is featurized and used as a labeled dataset for training a model that predicts the likelihood of a currently active user churning in the future. The training of such a model may be performed by DAP 117 or a computing system (e.g., server) in communication with DAP 117 and user database 110.

The historical user data may include application usage patterns, device usage patterns, lack of engagement patterns, information about auto-tech support interactions, churn related information. Application usage patterns may include a frequency of interaction with application 106, a frequency of using features provided by application 106, performing certain actions through application 106 (e.g., purchasing products through application 106), number of days application was executing on the historical user's mobile device, a number of events logged, average number of events logged per day, etc. Device usage patterns may include a frequency of experiencing sensor failure, a frequency of sensor re-calibration, etc. Lack of engagement patterns may include a frequency of failing to call customer support, a frequency of failing to set up customer alert calendars, failure to interact with or upload data into application 106, etc. Information about each historical user's auto-tech support interactions includes time-stamped data associated with different interactions the user has had with auto-tech support (e.g., to resolve a technical issue, such as sensor failure), the frequency of the user's interactions with auto-tech support, etc. Churn related information includes information about whether the historical user churned, information around what was occurring when the user churned (whether the user experienced sensor failure, etc.).

Once a model is trained using the historical user data described above, DAP 117 may continuously or periodically predict the likelihood of each active user (with a user profile 118 in database 110) churning in the future. Where the model categorizes a user as having a likelihood of churn greater than a (e.g., predefined/defined) threshold, DAP 117 may identify the user as part of a cohort that needs to be communicated with (e.g., by application 106) to reduce or avoid churn. In addition, once a user is identified as having a likelihood of churn greater than a (e.g., predefined/defined) threshold, DAP 117 may use a rule-based model to identify the root cause of the churn. For example, the rule-based model may have various rules associated with various root causes and if the user's recent data matches one of the rules (e.g., more than 5 sensor failures in the past 3 days), then the actual root cause can be identified and the communication that is sent to the user through CEP 116 can be tailored based on that.

In order to predict the likelihood of a currently inactive or churned user never returning, DAP 117 may use a model that is similar to the model described above for estimating likelihood of future churn for an active user. However, the model for predicting the likelihood of a currently inactive user never returning may additionally take as input data relating to upload history of a user to aid in estimating the likelihood of the user never returning. Upload history may be provided in the form of different features as input into the model. One example of such a feature includes the number of days that a user has been inactive. The model for predicting the likelihood of a currently inactive user never returning can be trained with similar machine learning algorithms and techniques, as described above, using a training dataset that includes the features described above as well as features associated with the upload history of each historical user.

In certain embodiments, DAP 117 may use yet another model to predict the likelihood of an inactive user 102 returning to use the application within a specified time period. The time period may be predetermined, and in some cases, may represent a 90-day window. Thus, the model may predict the likelihood of a currently inactive user 102 returning to use the application within 90 days. The model may be a similar to the model used for estimating a likelihood of an inactive user who has churned to never return; however, this model may be trained using a dataset including additional or more specific churn-related features, including a feature that indicates whether the historical user returned within a specific period of time, e.g., 90 days, after being inactive.

Similar to alert fatigue and user churn, DAP 117 may perform additional analysis to identify one or more users that may be suitable for or benefit from feature education relating to a certain feature of application 106. According to embodiments described herein, an event, time or user-based approach, or any combination thereof, may be used to identify one or more users to recommend a feature of the application to, to educate about a setting of an existing feature they are currently using, etc. Feature education may, in some cases, be an extension of onboarding to further inform users about features and/or settings of the application.

In some embodiments, a time-based approach may be used to identify one or more users to educate them about one or more features and/or settings of application 106. For example, DAP 117 may be configured with a rule to identify any users that have only been using application 106 for a month or less and have not used a specified feature. Such users may be identified as part of a cohort to be educated about the specific feature. Communication with each of these users may, for example, notify the user that the specified feature is available on application 106 while also providing an explanation as to the advantages of using such a feature. In another example, DAP 117 may be configured with a rule to notify all users every time a new feature and/or setting is added to application 106.

In some embodiments, an event-based approach may be used to identify one or more users as part of a cohort to educate about one or more features and/or settings of application 106. For example, DAP 117 may be configured to identify one or more users to communicate with (e.g., for purposes of feature education, to recommend a feature to be used, or to recommend reconfiguration of an existing feature) based upon a certain event happening. For example, an event may include identifying user as currently experiencing alert fatigue. Such an event may trigger DAP 117 to identify the user to educate about different alert settings that may be configured for application 106 in order to help reduce the alert fatigue experienced by the user. In another example, an event may include logging of meal and/or calorie information by a user. Such logging of meal and/or calorie information may trigger DAP 117 to identify the user as a good candidate for recommending use of a certain exercise feature of application 106, for which the user would not have otherwise benefitted from or been previously eligible to use.

In another example, DAP 117 may examine the user's glucose measurements over time and identify that the user's glucose condition requires the use a certain feature of application 106. For example, the user's glucose measurements may indicate that the user suffers from a certain diabetic condition, in which case a specific feature of application 106 may need to be used for monitoring that condition. In such cases, the user is then identified as part of a cohort to be educated about the feature. In addition, DAP 117 may identify that in order to use this specific feature, the user may need to change their analyte monitoring system. In certain embodiments, DAP 117 may perform such identification based on a mapping between different features and different analyte monitoring systems. In such an example, any content to educate the user about the feature may also notify the user about the need to use a different analyte monitoring system.

In some embodiments, a user-based approach may be used to identify users to educate about one or more features and/or settings of application 106. For example, DAP 117 may be configured to evaluate information included in each user profile 118 to determine whether or not the corresponding user is a suitable candidate to educate about a feature, to recommend a feature for usage, or to recommend reconfiguration of an existing feature. In some embodiments, DAP 117 may examine each user's health condition, age, gender, interests, abilities, etc., as indicated by the user's profile 118. For example, DAP 117 may consult a user's profile 118 and determine the user has a physical disability. Based on this information, DAP 117 may determine the user may not be an ideal user to communicate with regarding a cardio/exercise feature of application 106 given the user is physically disabled.

In some embodiments, a combination of time-based, event-based, and/or user-based approaches may be used to identify users for feature education. For example, where DAP 117 identifies a user who has been using application 106 for a month or less and has not used a cardio/exercise feature (e.g., using a time-based approach), DAP 117 may further identify if the user is a good candidate to educate about the cardio/exercise feature by consulting the user's profile 118 (e.g., using a user-based approached). Assuming DAP 117 determines the user is physically disabled, even though the user is new and has not used this feature, DAP 117 may leave this user out of a cohort that is to be educated about the cardio/exercise feature.

In certain embodiments, to determine whether a user has used a feature provided by application 106 or not, DAP 117 may automatically consult the user's profile 118 to examine the current application configuration used by the user. The application configuration identified in user profile 118 may provide information as to what features have previously been turned on or not. In certain embodiments, DAP 117 may also have access to settings of each feature used by the user to determine whether correct settings for each feature are being used. For example, where a user is experiencing alert fatigue, DAP 117 may determine alert settings currently being used by the user by consulting the user's profile 118. The user's profile 118 may indicate that the user has never changed their settings for alert notifications; thus, DAP 117 may assume the user is not aware of an ability to change their alert setting. Accordingly, DAP 117 may assign the user to a cohort for recommending a change in alert settings. In some embodiments, DAP 117 may also have access to activity logs of the user, information about system state changes, event creation, etc.

After identifying a user cohort to communicate with, in accordance with the set of criteria defined for the campaign, at block 308, operations 300 continue by DAP 117 identifying one or more communication configurations for communicating with each of the users in the cohort. In other words, in addition to identifying "to whom" the communication is to be directed to, DAP 117 further determines "what" and "how" the communication is to be communicated to each of the users in the cohort. As mentioned, communication configurations may include, but are not limited to, content, tone, tenor, medium, timing, and/or frequency of communication. The communication may be provided as part of a campaign (e.g., marketing, advertising, tech-support, alert fatigue, feature education, user churn), communication provided by an application using different GUI configurations, communication provided by a website using different website designs, to name a few. Note that in the case of any communication provided by decision support engine 112, steps 302-306 of operations 300 are not applicable because the identity of the user is known. In such cases, decision support engine 112 utilizes CEP 116 and DAP 117 in order to determine communication configurations that increases the user's engagement over time.

In some embodiments, identifying the one or more communication configurations comprises: (i) identifying a set of communication configurations; and (ii) for each sub-group of the one or more identified subgroups: (a) determining a set of reward scores for users in the sub-group with respect to the set of communication configurations, wherein each of the set of reward scores for the sub-group with respect to a corresponding communication configuration is determined based on a historical engagement score associated with historical communications transmitted to the users in the sub-group in accordance with the corresponding defined communication configuration, and (b) identifying an optimal communication configuration from the set of communication configurations for the sub-group based on the set of reward scores. In some embodiments, the identified one or more communication configurations comprises the optimal communication configurations identified for the one or more sub-groups. In some embodiments, the historical engagement score for a communication configuration describes a recorded measure of user engagement for communications that are generated in accordance with the noted communication configuration. In some embodiments, a reward function is used that describes a reward score for each of the one or more communication configurations, where the reward score for a particular communication configuration is determined based on the historical engagement score associated with historical communications transmitted to the users in a sub-group in accordance with the corresponding defined communication configuration.

In cases where campaigns are defined by a professional 120, the professional may manually define the communication configurations for the user cohort or the sub-groups therein. For example, professional 120 may use a user interface provided by CEP 116, or communication application 114a, to define communication configurations for the cohort or the various sub-groups in the cohort. The user interface may provide different options for professional 120 to define various sub-groups, thereby allowing professional 120 to manually select (e.g., from a dropdown providing multiple options) one of many communication configurations for each sub-group. For example, the user interface may allow for dividing a cohort into different sub-groups by age, including a first sub-group with ages of 10-20 years old, a second sub-group with ages of 21-50 years old, and a third sub-group with ages of 51-80 years old.

In such an example, professional 120 may select one or more of a plurality of communication configurations for communicating with each of the first sub-group, the second sub-group, and the third sub-group. As an example, where the communication configurations include different options for message content, such as messages with less formality including content such as "What's up", messages with neutral formality including content such as "Hello" or "Good morning", and messages with greater formality including content such as "Hello Mr. X. Hope you are having a good morning.", professional 120 may determine to communicate with the first sub-group using messages with less formality, the second sub-group using messages with neutral formality, and the third sub-group using messages with greater formality. Customizing the message content for the different sub-groups increases the likelihood of engagement. Where messages appeal to a user, it is more likely that the user will engage with the application, thus the identification of the appropriate communication configurations may be crucial to increasing engagement and retention of users. In embodiments where the professional identifies the different communication configurations for the different sub-groups, CEP 116 may communicate with the different sub-groups using the corresponding communication configurations selected for each sub-group.

Unfortunately, manual selection of different communication configurations for different sub-groups is a challenging task. Further, given the ever-changing preferences and characteristics of a user cohort, constant recalibration of communication configurations and sub-groups is beneficial for maximizing customer engagement within each sub-group. A professional 120 is not able to process the amount of information associated with thousands of users, select communication configurations that will maximize engagement within different sub-groups, collect and process data relating to customer engagement resulting from the use of the selected communication configurations, and recalibrate or modify the communication configurations and/or the sub-groups based on the customer engagement data, and continuously repeat this cycle.

Thus, the embodiments herein provide a technical solution to the technical problem described above. More particularly, health monitoring and support system 100 reflects a technical improvement over existing health monitoring and support systems. Health monitoring and support system 100 provides DAP 117, which is configured with one or more complex models, such as machine learning models, to identify (e.g., automatically) optimal communication configurations for communicating with a user or various sub-groups within a cohort in order to maximize user engagement.

For example, DAP 117 may be configured to use a statistical model, such as a MAB model, to explore various communication configurations in communicating with various users over several communication rounds in order to identify one or more optimal communication configurations for communicating with different sub-groups within the cohort in order to maximize engagement. In some embodiments, DAP 117 uses a non-contextual (i.e., standard) MAB model (e.g., shown in FIG. 4) and, in other embodiments, a contextual MAB model (shown in FIG. 5) or a full reinforcement learning model (shown in FIG. 6). Details associated with how various MAB models can be used by DAP 117 to identify one or more communication configurations for communicating with different users within the cohort are further described in relation to FIGS. 4-6 and are omitted here for brevity.

At block 310, operations 300 continue by DAP 117 providing an indication of the identified communication configurations for communicating with the users of the identified cohort.

At block 312, communications are transmitted to the identified one or more users or user groups using the indicated one or more communication configurations for communicating with each of the identified one or more users or user groups. In certain embodiments, the communication is performed by CEP 116 itself. In certain embodiments, the communication is performed by an application (e.g., application 106 or software applications 114 illustrated in FIG. 1A) that is interfacing with CEP 116 or DAP 117. In some embodiments, one or more communications are transmitted to each user of the user cohort, where the communications that are transmitted to a corresponding user are determined based on the content and a corresponding communication configuration for a sub-group that comprises the corresponding user.

At block 314, operations 300 continue by DAP 117 measuring engagement outcomes associated with the usage of the one or more communication configurations in communication with each of the sub-groups. Engagement outcomes generally indicate how successful the selection and usage of a certain one or more communication configurations were with respect to a corresponding sub-group.

Outcomes may generally either be positive or negative with respect to user engagement. Example of outcomes may include an increase/decrease in user interaction with, e.g., application 106, average improvement or regression of glucose state(s) of users in a sub-group, following through with one or more instructions, etc. As described further below, a reward function may be configured to measure engagement outcomes associated with using different communication configurations for different sub-groups and keep a mapping of different rewards calculated for the different communication configurations. Many different metrics (e.g., metrics 130) or parameters may be used for measuring engagement outcomes. For example, an increase/decrease in the interaction of the user or the user group may be evidenced by whether users within a sub-group acknowledge (e.g., click on) a message, start using a UI feature, increase an amount of times the application is opened each day, etc. A reward function may take into account a single metric (e.g., click-through rate) or multiple metrics (e.g., click-through rate, frequency of interaction with application 106, improvement in glucose time-in-range).

To illustrate how rewards are calculated, in a simple example, a first communication configuration may have been used in communicating a notification with a first sub-group and a second communication configuration may have been used in communicating the notification with a second sub-group. As an example, the first and second communication configurations may be time related such that the first communication configuration may have required the transmission of the notification to the first sub-group at 6 pm while the second communication configuration may have required the transmission of the notification to the second sub-group at 10 am. Further, in this example, the first sub-group may correspond to half of a user cohort while the second sub-group may correspond to the other half.

Transmitting the same notification to different sub-groups at different times may yield different engagement outcomes. For example, users may generally find it more convenient to react to (e.g., click on, upload data, interact with a feature) a notification at 6 pm when they are more likely to be done with work than at 10 am during work. As a result, the rewards calculated based on the engagement outcomes associated with the first sub-group in this example may be much higher or more desirable. For example, 70% of users may click on the notification in the first group instead of 50% in the second group. Therefore, as an example, a 0.7 or 70% reward may be calculated for the engagement outcomes associated with using the first communication configuration for the first sub-group, while a 0.5 or 50% reward may be calculated for the engagement outcomes associated with using the second communication configuration for the second sub-group.

Having calculated rewards for the different communication configurations, for subsequent rounds of communication, DAP 117 may be configured with one of a variety of bandit strategies to maintain a balance between exploiting the communication configuration(s) that yielded the highest rewards and exploring or learning about other communication configurations and their impact on user engagement. As further described below in relation to FIGS. 4-6, examples of different bandit strategies may include epsilon greedy, epsilon first, and other strategies that can be implemented with different algorithms. Exploiting and exploring may generally be performed by DAP 117 through altering the selection of communication configurations, the number of sub-groups, the size of the sub-groups for the subsequent rounds of communications, etc. As shown with a looping arrow in FIG. 3, for subsequent rounds of communication, DAP 117 continues to exploit and explore and repeats the cycle in order to optimize user engagement. Note that depending on the bandit strategy DAP 117 employs, DAP 117 may continue to always explore and experiment with non-optimal communication configurations, as, in some cases, what may be a non-optimal communication configuration at one time may turn into an optimal communication configuration.

Example System Using a Non-Contextual MAB Model for User Engagement

Figure 4:
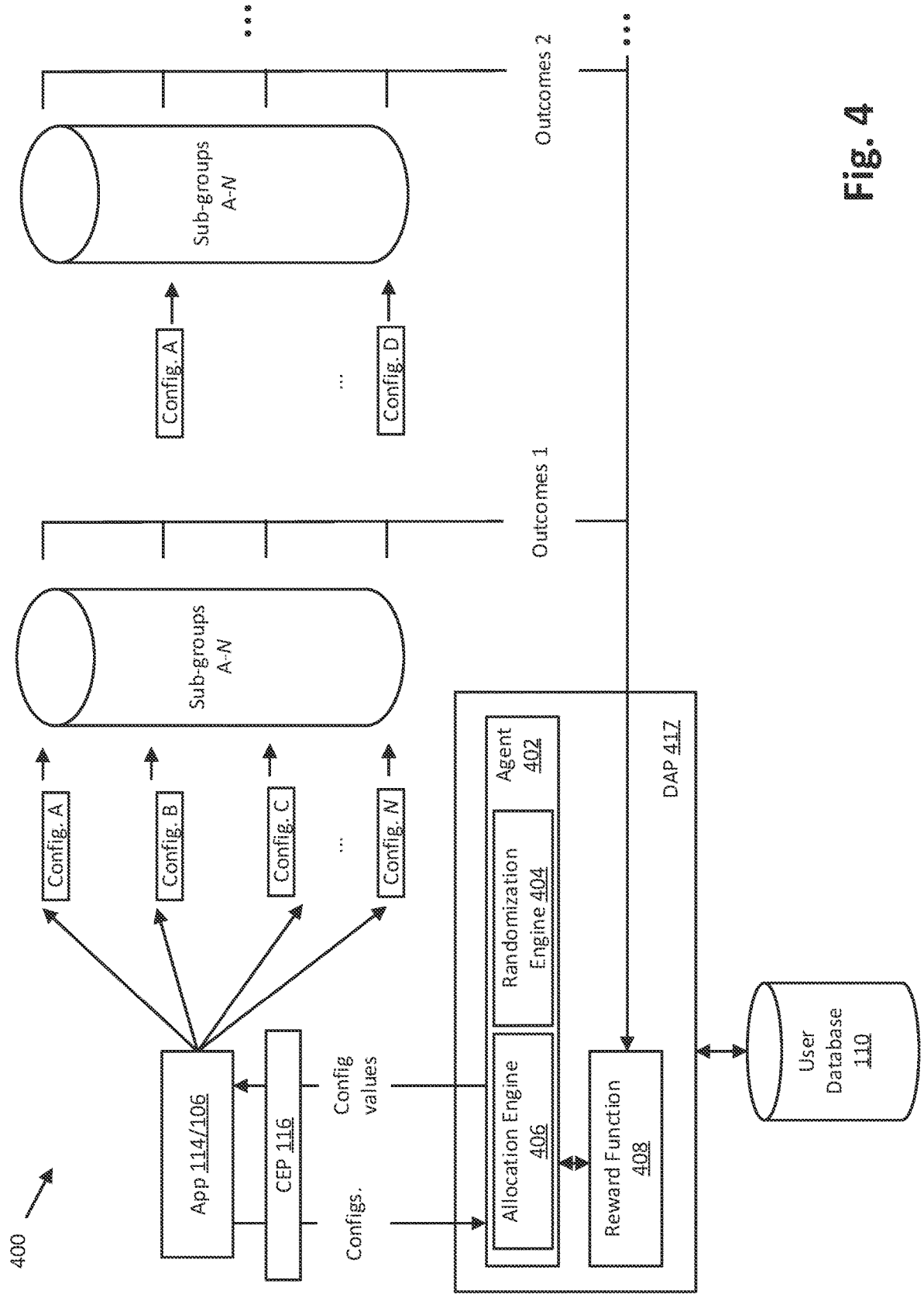
FIG. 4 illustrates an example of using a non-contextual multi-armed bandit model to identify communication configurations for communicating with users associated with the health monitoring and support system of FIG. 1A, according to certain embodiments disclosed herein.

FIG. 4 illustrates an example system 400 that uses a non-contextual MAB model to identify optimal communication configurations for communicating with users in order to maximize engagement, according to certain embodiments disclosed herein. An agent resigning in DAP 417, such as what is shown in FIG. 4, may implement a non-contextual MAB model using a reward function 408 as well as an agent 402 including an allocation engine 406 and a randomization engine 404. To help with understanding functions of each of these elements, the operations of agent 402 are illustrated with reference to an example where DAP 417 is configured to determine optimal messaging content for communication with a user cohort. The messaging content may be chosen from four configurations: (A) a less formal messaging configuration of "What's Up?", (B) a neutral formality messaging configuration of "Hi", (C) a neutral formality messaging configuration of "Hi [Enter User's Name]", and (D) a more formal messaging configuration of "Hello, Mr. [Enter User's Name]". Although only four messaging configurations are considered for analysis in this example, as shown in FIG. 4, any number of messaging configurations A-N, where N is an integer greater than one, may be considered. In the example of FIG. 4, N is 4.

As shown in FIG. 4, as a first step (e.g., block 402 of FIG. 4), agent 402 obtains the four communication configurations (e.g., Configurations A-D) from an application (e.g., such as one of applications 114 or application 106 illustrated in FIG. 1A) through CEP 116. Agent 402 includes allocation engine 406 and randomization engine 404. Allocation engine 406 is responsible for dividing the user cohort (e.g., 1000 users) into a number of different sub-groups, such as four sub-groups each including 250 users. Note that dividing the cohort into four sub-groups or some of the additional details are merely provided as an example. The number of sub-groups allocation engine 406 divides the user cohort into, the size of each sub-group, etc., are dependent on the bandit strategy or algorithms allocation engine 406 is configured with.

Since at this point agent 402 has no knowledge of which communication configuration is optimal or yields the most engagement, the randomization engine 404 then randomly assigns the different communication configurations A-D to the four sub-groups. Once a communication configuration is assigned to each sub-group, agent 402 may then indicate to CEP 116, which communication configuration should be used for which sub-group. For example, agent 402 may indicate four configuration values to CEP 116, each corresponding to a different sub-group. For example, communication configuration A is assigned to sub-group A, communication configuration B is assigned to sub-group B, communication configuration C is assigned to sub-group C, and communication configuration D is assigned to sub-group D. CEP 116 may then communicate the mapping between configuration values and sub-groups to the application 114/106. Subsequently, application 114/106 sends communication (e.g., notifications) to each of the four sub-groups using their corresponding communication configuration (e.g., four different messaging contents in this case).

After communicating with each of user groups A-D using their corresponding communication configurations, DAP 417 may use reward function 407 to examine rewards for the engagement outcomes associated with the first round of communications transmitted to user groups A-D (shown as "Outcomes 1" in FIG. 4). For example, the first round's engagement outcomes may indicate that 80% of users in sub-group A, 70% of the users in sub-group B, 30% of the users in sub-group C, and 50% of the users in sub-group D clicked on the notifications sent to the sub-groups. As a result, reward function 407 may calculate an 80% reward for using configuration A with sub-group A, a 70% reward for using configuration B with sub-group B, a 30% reward for using configuration C with sub-group C, and 50% reward for using configuration D with sub-group D. Note that calculating rewards using click rate is just an example and that a reward function may have many different variables for measuring engagement (e.g., metrics 130 and other parameters previously described).

Having obtained the rewards discussed above, agent 402 is able to determine that communication configuration A has achieved the best engagement outcome. However, for the second round of communications, the percentage of the users the allocation engine 406 will use communication configuration A for will also depend on the bandit strategy. As is known to one of ordinary skill in the art, there are a variety of bandit strategies and, therefore, a variety of corresponding exploitation/exploration algorithms for implementing such strategies.

For example, in some embodiments, the allocation engine 406 may be configured with an exploration/exploitation algorithm that first explores, for a threshold amount of time, and then exploits for the remaining amount of time (e.g., also referred to in the art as epsilon first). In some embodiments, the exploration/exploitation algorithm may be configured such that the exploration is performed for a significantly smaller amount of time (e.g., 10%) than exploitation (e.g., 90%) (e.g., also referred to in the art as epsilon greedy). In the example of FIG. 4, based on exploration/exploitation logic configured for allocation engine 406, DAP 417 may continue to explore even after the initial exploration phase. In some examples, any continued exploration may be with a small percentage of users to allow the agent 402 to continuously acquire knew knowledge about the user cohort and the different communication configurations while also maximizing engagement with respect to the majority of the users by using the optimal communication configuration. As mentioned, preferences and characteristics of users in each sub-group may be constantly changing. To account for such changes, agent 402 may continue to explore to determine if a previously optimal configuration is no longer optimal based on another previously sub-optical configuration producing more reward. In other words, continuing to explore allows agent 402 to find and use the most optimal communication configuration over time.

As an example, for the second round of communication, allocation engine 402 may exploit communication configuration A by using it for 90% of the user cohort (e.g., 900 users) while experimenting with the other 10% of the users. For example, for the 10% of the users, randomization engine 404 may randomly select one of the other configurations, such as configuration D. Rewards are then calculated by reward function 408 based on engagement outcomes associated with the second round of communication (shown as "Outcomes 2" in FIG. 4).

Using the non-contextual MAB model described above, agent 402 continues to exploit the most optimal communication configuration and explore or learn about the user cohort and the additional communication configurations, thereby maximizing rewards, i.e., engagement, among a user cohort.

Example System Using a Contextual MAB Model for User Engagement

Figure 5:
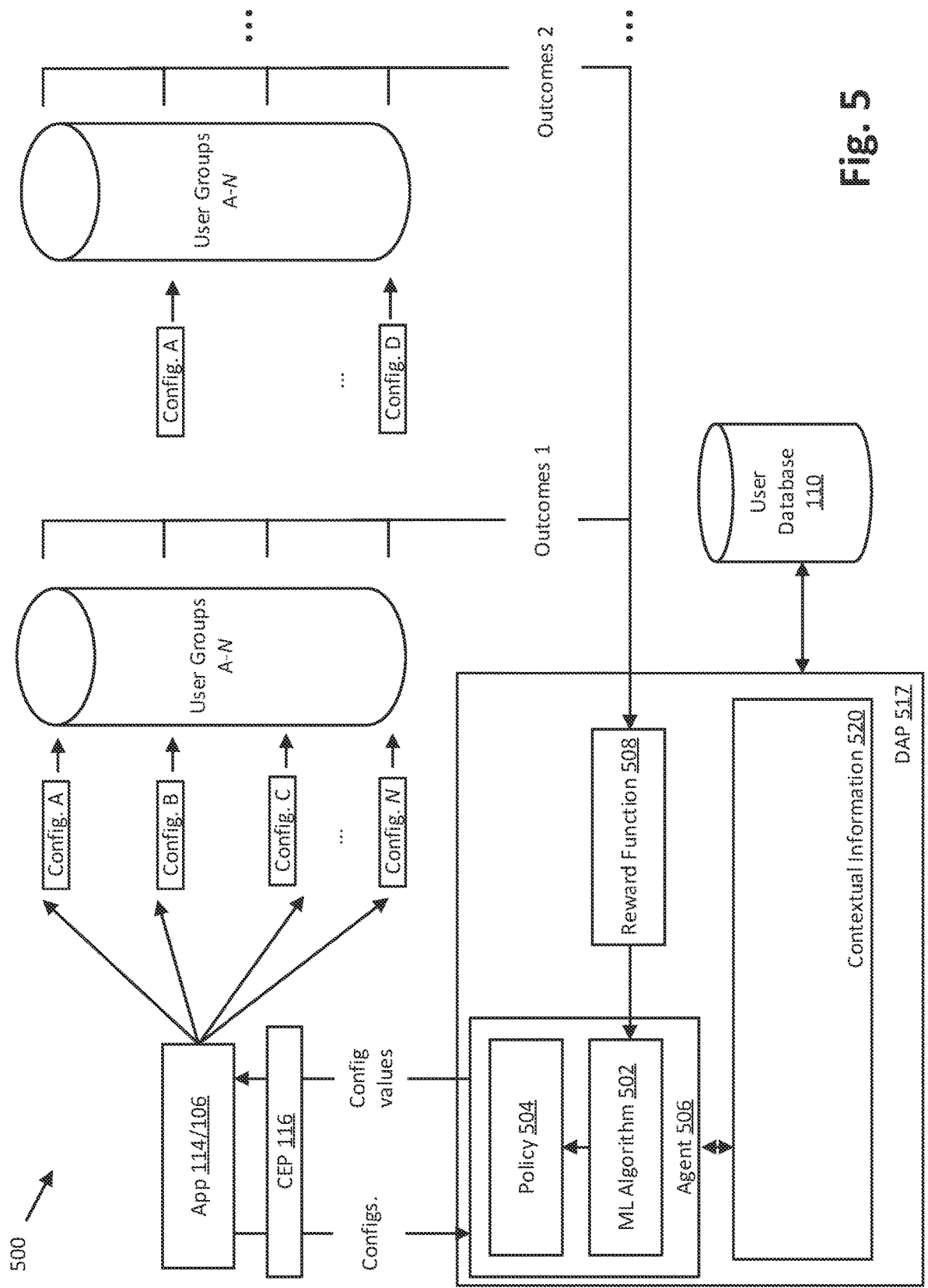
FIG. 5 illustrates an example of using a contextual multi-armed bandit model to identify communication configurations for communicating with users associated with the health monitoring and support system of FIG. 1A, according to certain embodiments disclosed herein.

FIG. 5 illustrates an example system 500 that uses a contextual MAB model to identify optimal communication configurations for communicating with different sub-groups within a user cohort, according to certain embodiments disclosed herein. As shown in FIG. 5, agent 506 of DAP 517 includes both (1) a policy 504 and (2) an ML algorithm 502 for training and updating the policy. Policy 504 is trained to take contextual information 520 about users of a cohort, as input, and determine an optimal communication configuration to use for communicating with each different sub-group within the cohort, with the goal of maximizing user engagement within the sub-group. In certain embodiments, policy 504 is machine learning model, such as a neural network, a deep neural network model, a supervised learning model, a simplified reinforcement learning algorithm, etc. In some embodiments, algorithm 502 is a supervised learning algorithm, which is generally concerned with how policy 504 can be trained to take suitable action in complex environments and use the feedback to maximize reward over time. A machine learning based contextual bandit model may generally operate on the basis of the following factors: (1) context (input into the model), (2) output, (3) outcome, and (4) reward.

In some embodiments, the policy 504 is a sub-group allocation policy that is configured to allocate users of a user cohort into a set of user cohorts. In some embodiments, the sub-group allocation policy is a machine learning model that is trained in accordance with expected reward measures defined by a reward function, where the reward function is configured to relate input contextual data for a given user to the expected reward measures for the given user across the one or more corresponding communication configurations. In some embodiments, for each user in the user cohort, the DAP processes input contextual data associated with the user using the sub-group allocation policy to generate an allocated communication configuration of the one or more communication configurations. In some embodiments, the allocated communication configuration for a particular user is the communication configuration that is expected to maximize expected engagement of the particular user with the software application based on the relationships described by the reward function. In some embodiments, each of the one or more identified sub-groups corresponds to one of the one or more communication configurations and comprises a subset of users in the user cohort whose allocated communication configurations is the corresponding communication configuration.

Context

The context associated with a user can be derived based on contextual information. Contextual information may be provided in the form of a context vector and include demographic information, disease progression information, medication information, as well as information relating to the current state of the user, such as the current glucose state, insulin on board, health/sickness, current activity, food consumption, other information provided as part of metrics 130 of FIG. 2, or any other information that helps categorize users of a cohort into different sub-groups. As an example, the user's age or gender may be used as contextual information and, therefore, depending on the user's contextual information they may fall into a certain sub-group. If the user is male (e.g., context A), the user may be placed into a first sub-group and, if the user is female (e.g., context B), the user may be placed into a second sub-group. Note that the contexts described above are merely examples and that more complex or granular contexts may also be defined (e.g., state that takes into account a combination of gender, disease progression, age, etc.), such as with the use of multidimensional context vectors. The goal of agent 506 is to use algorithm 502 to modify its policy 504, so that eventually given any context, agent 506 can always take the most advantageous action, the one that will produce the most reward.

Output

The output of policy 504 refers to the communication configurations that are recommended by policy 504 for communicating with different sub-groups. For example, for a certain context, policy 504 may select the communication configuration with the highest probability of achieving maximum user engagement. As discussed, examples of outputs may include recommendations to, for example, use tone A over tone B for a specific user group, use message content A over message content B for a specific sub-group, use message timing A over message timing B for a specific sub-group, etc.

Outcome

Outcomes correspond to the impact policy 504's outputs have on user engagement. For example, whether a user clicked on or started using a UI/application feature, or whether the user's glucose state improved, are examples of outcomes. As described below, reward function 508 is configured to measure each outcome by assigning it a value.

Reward

A reward function (discrete or continuous) can be defined based on the environment and the outcomes. A reward function, such as reward function 508, takes data associated with outcome(s) in a certain environment and transforms that data into a metric that is configured to be optimized. For example, if policy 504 is configured to optimize for click-through rates, then the reward function 508 may be a one-to-one mapping of whether or not the user clicked on a certain message. In other examples, reward function 508 may be more complex. For instance, if policy 504 is configured to optimize for a more long-term outcome (e.g., retention over time, predicted customer lifetime value), then a more complex reward function may be designed.

In the example of FIG. 5, DAP 517 initially (e.g., the first communication round) may have no knowledge of which communication configurations are optimal for which context. In other words, policy 504 is not trained with any mappings between communication configurations and contexts. Therefore, initially, contextual information about each user is received (in the form of a context vector), based on which each user may fall into a certain sub-group of users. For example, a context vector may be configured to indicate which of the following age ranges each user's agent falls into: (1) ages 1-20, (2) ages 21-40, (3) 41-60, and (4) 61-80. As a result, agent 506 then takes context vectors relating to each user in the cohort and divide users into four sub-groups, each including one or more users. Policy 504 may then randomly assign the four communication configurations to the four sub-groups and indicate the corresponding configuration values to CEP 116. Note that age is one example of contextual information and that other types of contextual information may be used in addition or alternatively. For example, in addition to age, agent 506 may also examine each user's disease progression (e.g., Type I versus Type II), glucose information, and any of the other metrics 130 in FIG. 2, or a combination thereof. In other words, the granularity of the sub-groups and how they are divided may vary in different embodiments. Further, note that the number and size of the sub-groupings provided above are merely for illustration purposes and exemplary.

Similar to FIG. 5, once the different communication configurations are assigned to the different sub-groups, CEP 116 then communicates the mapping between configuration values and sub-groups to the application 114/106. Subsequently, application 114/106 sends communication (e.g., notifications) to each of the four sub-groups using their corresponding communication configuration (e.g., four different messaging contents). After communicating with each of user groups A-D using their corresponding communication configurations, DAP 117 may use reward function 507 to examine rewards for the engagement outcomes associated with the first round of communications transmitted to user groups A-D (shown as "Outcomes 1" in FIG. 5). ML algorithm 502 then trains policy 504 based on the rewards, the context vectors, and the configuration communications assigned based on the context vectors. The different contexts, communication configurations, and rewards are used as features in the machine learning model corresponding to policy 504.

Repeating this process for many different communication rounds allows policy 504 to be trained to determine which communication configuration should be assigned to which context vector to maximize rewards (i.e., an optimal mapping of contexts to communication configurations). In other words, over time, by exploiting and exploring different communication configurations with respect to different users, agent 506 collects enough information about how the contexts and rewards relate to each other, so that agent 506 can predict the best communication configuration to assign to each context in every round of communication. For example, in each communication round, agent 506 chooses a communication configuration for each user based on a context vector associated with the user and information about the rewards collected previous rounds relating to the context vector.

Figure 6:
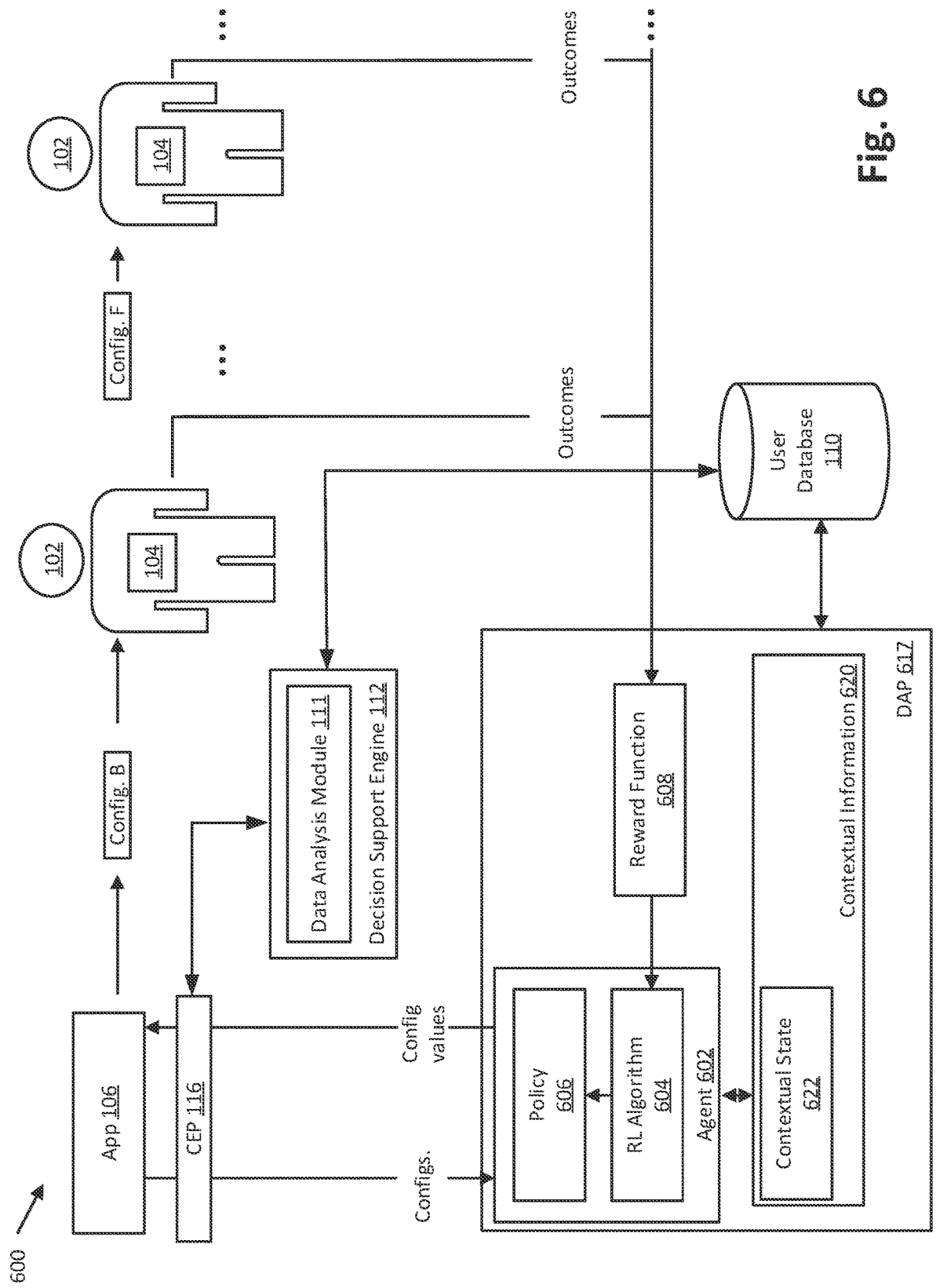
FIG. 6 illustrates an example of using a full reinforcement learning model to identify communication configurations for communicating with users associated with the health monitoring and support system of FIG. 1A, according to certain embodiments disclosed herein.

Example System Using a Statistical Approach for a User Engagement of Mobile Health Applications FIG. 6 illustrates an example system 600 that uses a reinforcement learning model to identify optimal communication configurations for providing decision support guidance to a user, according to certain embodiments disclosed herein. FIG. 6 illustrates a similar approach to the approach described with respect to FIG. 5; however, instead of determining optimal communication configurations for communicating with users or user groups to increase user engagement with an application (e.g., software application 114) as shown in FIG. 5, FIG. 6 illustrates the determination of optimal communication configurations for communicating with a single user to increase user engagement with an application (e.g., application 106) configured to provide decision support to the user.

As mentioned, decision support engine 112 includes DAM 111 which is configured to process a set of inputs 127 (e.g., measured by a continuous glucose monitor, input by the user, etc.) to compute a plurality of metrics 130. Metrics 130 are used by decision support engine 112 to provide real-time guidance (e.g., decision support) to the user, such as through application 106 and its different features. In some embodiments, decision support engine 112 may tailor communication with the user to increase user engagement with application 106. Tailoring communication with the user may refer to the application of different communication configurations to decision support messaging provided to the user. In certain embodiments, changing or tailoring decision support communication through using different communication configurations may be accomplished by changing settings of the different features of application 106. For example, an exercise management feature may have a setting A that sends notifications to a user to work out every time the user has a big meal or only sends such notifications after 6 pm.

To determine optimal communications configurations for communicating such decision support to a user of application 106, decision support engine may consult with DAP 617. DAP 617 in system 600 may use a full reinforcement learning model to identify one or more optimal communication configurations for communicating to maximize user engagement. Unlike in systems 400 and 500, in the example of FIG. 6, DAP 617 determines optimal communication configurations for a single user rather than multiple users or user groups. As such, the agent 602 includes a policy 606 that is personalized to the user. In other words, policy 606 is trained by reinforcement learning algorithm 604 to increase engagement specifically for a single user. As a result, DAP 617 may have a different policy 606 trained for each user of application 106. Policy 606 may be a deterministic policy that maps contextual state to action (communication configuration) without uncertainty. Policy 606 may be also be a stochastic policy that outputs a probability distribution over actions in a given state. Also, policy 606 may be trained using various methods, such as policy optimization or iteration methods (e.g., policy gradient method, Asynchronous Advantage Actor-Critic (A3C), Trust Region Policy Optimization (TRPO), Proximal Policy Optimization (PPO), etc.) or Q-learning or value-iteration methods (Deep Q Neural Networks, C51, etc.), as well as other methods.

In some embodiments, the policy 606 is a sub-group allocation policy hat is configured to allocate users of a user cohort into a set of user cohorts. In some embodiments, the sub-group allocation policy is a machine learning model that is generated in accordance with expected reward measures defined by a reward function, where the reward function is configured to relate an input contextual state for a given user to the expected reward measures for the given user across one or more actions, and each of the one or more actions corresponds to one of the one or more corresponding communication configurations. In some embodiments, for each user in the user cohort, the DAP processes the input contextual state associated with the user using the sub-group allocation policy to generate an allocated action of the one or more allocated actions. In some embodiments, the allocated action for a particular user is the action that is expected to maximize expected engagement of the particular user with the software application based on the relationships described by the reward function. In some embodiments, each of the one or more identified sub-groups corresponds to one of the one or more actions and comprises a subset of users in the user cohort whose allocated action is the corresponding action.

A full reinforcement learning model operates on the basis of (1) contextual states, (2) environment (3) output, (4) outcome, and (5) reward. The concept of contextual states in a full reinforcement learning model is similar to the concept of contexts in a contextual bandit model but with some differences. For example, the main difference is that, in reinforcement learning, an action in a certain state does not only affect the reward that the agent will achieve but it will also affect the next state the agent will be in, while, in a contextual bandit model, an action in a state only affects the reward the agent will achieve, but it does not affect the next state the agent will be in. As shown in FIG. 6, contextual states 622 are derived from contextual information 620 obtained about the user in a certain environment.

In reinforcement learning, an agent, such as agent 602, is trained to continuously explore, interact with, and learn from a specific environment. Examples of different environments which may be considered by agent 602 may include, but are not limited to, a glucose-related environment, a marketing-related environment, and an application-related environment. A glucose-related environment includes all parameters that relate to or define the glucose state of the user. Accordingly, in determining which communication configuration is optimal for communicating, the agent 602 may learn from the impact a certain output (i.e., communication configuration) has had on the glucose state of the user in the past. A marketing-related environment includes all parameters that relate to or define the engagement of the user with marketing/advertising actions (e.g., click rates, etc.). An application-related environment includes all the parameters that relate to or define engagement of the user with an application (e.g., application 106) or an application feature, etc. Different environments may be defined for optimizing different types of engagement in a model. For example, an application-related environment may be configured if the goal of a model is to optimize engagement of a user with application 106. A glucose or health related environment may be configured if the goal of a model is to optimize health and/or diabetes condition of the user through additional engagement.

In the example of FIG. 6, decision support engine 112 may consult DAP 617, through CEP 116, to determine optimal communication configurations for communicating various recommendations to a user. DAP 617 may explore different communication configurations, e.g., tone, tenor, medium, timing, and/or frequency, for communicating recommendations to the user to determine optimal communication configurations. Similar to FIG. 5, in FIG. 6, DAP 617 receives contextual information 620 about a user from the user's profile and determines the user's contextual state in the corresponding environment based on the contextual information. As discussed, contextual information may include any information about the user, such as metrics 130 or other engagement related metrics, relevant to the environment that is set up by the model. Contextual information 620 is used to determine what state, i.e., contextual state 622, the user is in so that agent 602 is able to select the most optimal action based on the contextual state 622.

In order to build an optimal policy 606, agent 602 is configured to take action (e.g., select communication configurations) based on the contextual state of the user, observe the corresponding rewards, and adjust policy 606 based on the rewards so that, eventually, after a many rounds of communications and exploiting/exploring, the policy 606 is able to select the optimal communication configuration given any context the user is in.

By taking into account a user's contextual state, DAP 617 is able to make more informed decisions as to what communication configurations are ideal for communicating with a user in order to maximize engagement. For example, where DAP 617 sees a positive trend in a state of the user (e.g., based on metrics 130), DAP 617 may assume communication configurations being used to communicate with the user are positively impacting user. Positive impact on the user may, in some cases, be attributed to increased user engagement. Thus, DAP 617 will continue to recommend communication configurations that result in a positive trend in the state of the user to decision support engine 112 for use in communicating with the user.

Example Apparatus for User Engagement of Mobile Health Applications

Figure 7:
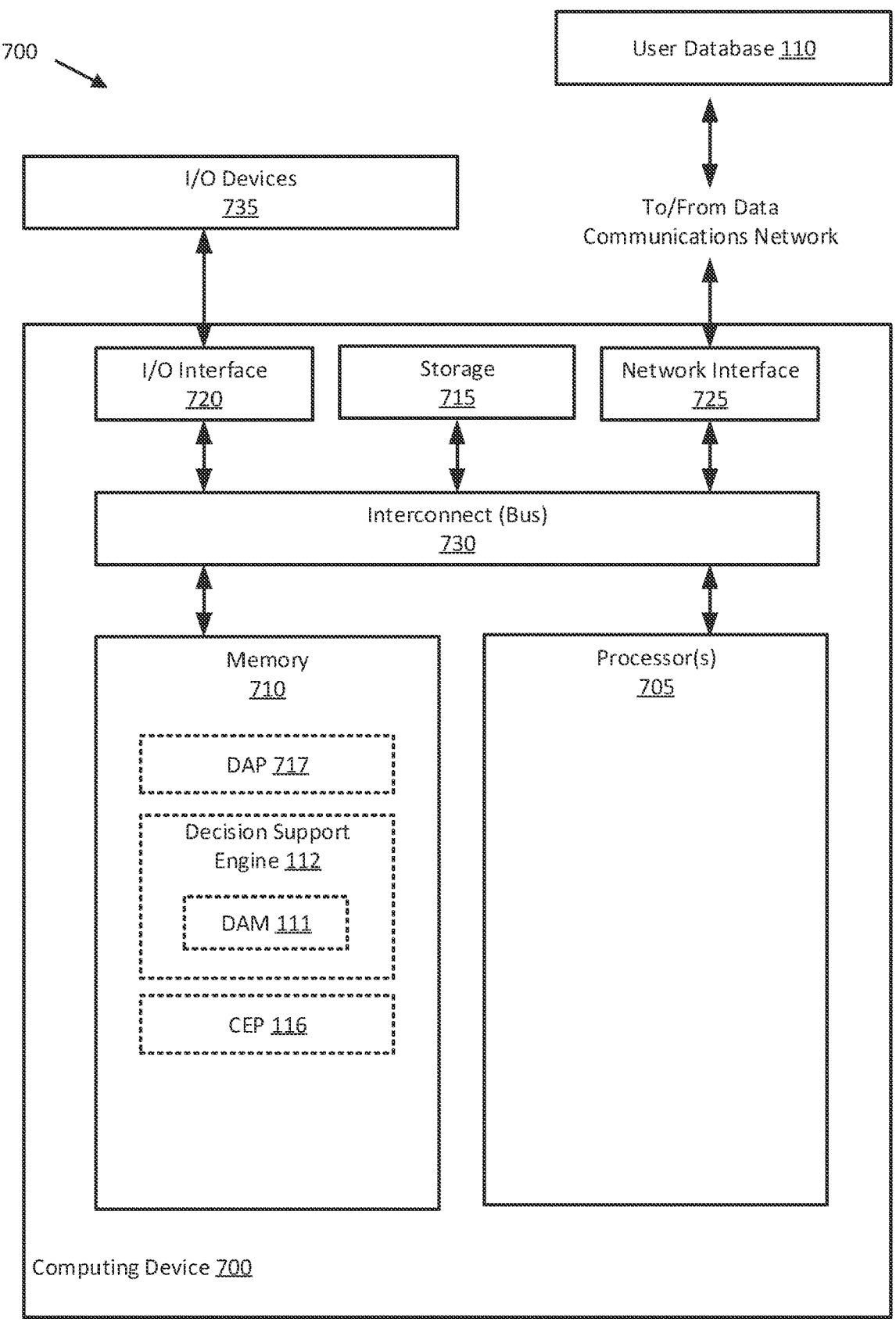
FIG. 7 is a block diagram depicting a computing system configured to perform the operations of FIG. 3, according to certain embodiments disclosed herein.

FIG. 7 is a block diagram depicting an example computing device 700 configured to select and continuously adapt communication configurations for communication with one or more users or user sub-groups to maximize user engagement, according to certain embodiments disclosed herein. Although depicted as a single physical device, in embodiments, computing device 700 may be implemented using virtual device(s), and/or across a number of devices, such as in a cloud environment. As illustrated, computing device 700 includes a processor 705, memory 710, storage 715, a network interface 725, and one or more input/output (I/O) interfaces 720. In the illustrated embodiment, processor 705 retrieves and executes programming instructions stored in memory 710, as well as stores and retrieves data residing in storage 715. In certain embodiments, memory 710 is configured to store instructions (e.g., computer-executable code) that when executed by processor 705, cause processor 705 to perform the operations illustrated in FIG. 3, or other operations for performing the various techniques discussed herein (e.g., FIG. 4-6). In certain embodiments, memory 710 stores code for executing the functions of DAP 117, CEP 116, and/or decision support engine 112. Note that computing device 700 may be configured to perform the functions of only one of DAP 117, CEP 116, or decision support engine 112, in which case additional system(s) may be used for performing the functions of the others.

Processor 705 is generally representative of a single central processing unit (CPU) and/or graphics processing unit (GPU), multiple CPUs and/or GPUs, a single CPU and/or GPU having multiple processing cores, and the like. Memory 710 is generally included to be representative of a random access memory (RAM). Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) can be connected via the I/O interface(s) 720. Further, via network interface 725, computing device 700 can be communicatively coupled with one or more other devices and components, such as user database 110. In certain embodiments, computing device 700 is communicatively coupled with other devices via a network, which may include the Internet, local network(s), and the like. The network may include wired connections, wireless connections, or a combination of wired and wireless connections. As illustrated, processor 705, memory 710, storage 715, network interface(s) 725, and I/O interface(s) 720 are communicatively coupled by one or more interconnects 730. In certain embodiments, computing device 700 is a server executing in an on-premises data center or a cloud environment.

In the illustrated embodiment, processor 705 includes, at least, DAP 117. Further, in some embodiments, processor 705 includes decision support engine 112, which itself includes DAM 111. In some embodiments, computing device 700 can be communicatively coupled with CEP 116 to perform operations of systems 300 and 400 of FIG. 3 and FIG. 4, respectively.

Each of these non-limiting examples can stand on its own or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round", a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A computing system for optimized delivery of communications including content to users of a software application, comprising:
   a memory comprising instructions; and
   a processor in data communication with the memory and configured to execute the instructions to cause the computing system to:
   identify, by a data analytics platform (DAP), a set of communication configurations for communicating with the users of the software application, the users being divided into a plurality of sub-groups;
   assign, by the DAP, a different communication configuration included in the set of communication configurations to each of the plurality of sub-groups;
   transmit, by a customer engagement platform (CEP), one or more communications to each of the users, wherein the one or more communications that are transmitted to a corresponding user are determined based on the content and the corresponding communication configuration for the sub-group that comprises the corresponding user;
   measure, by the DAP, engagement outcomes associated with usage of the corresponding communication configurations in communication with each of the plurality of sub-groups to determine a first communication configuration having an optimal engagement outcome;
   allocate, by the DAP, the first communication configuration having the optimal engagement outcome to an exploitation sub-group; and
   allocate, by the DAP, one or more communication configurations not having the optimal engagement outcome to one or more exploration sub-groups.

2. The computing system of claim 1, the processor further configured to execute the instructions to cause the computing system to transmit, by the CEP, one or more additional communications to each of the users, wherein the one or more additional communications that are transmitted to a corresponding user are determined based on additional content and either (i) the first communication configuration for the exploitation sub-group that comprises the corresponding user, or (ii) the one or more communication configurations for the one or more exploration sub-groups that comprise the corresponding user.

3. The computing system of claim 2, the processor further configured to execute the instructions to cause the computing system to:
measure additional engagement outcomes associated with usage of the first communication configuration with the exploitation sub-group and usage of the one or more communication configurations with the one or more exploration sub-groups;
identify, based on the additional engagement outcomes, a second communication configuration included in the one or more communication configurations as having the optimal engagement outcome; and
allocate, by the DAP, the second communication configuration to the exploitation sub-group.

4. The computing system of claim 3, the processor further configured to execute the instructions to cause the computing system to:
determine, based on the additional engagement outcomes, that the first communication configuration no longer has the optimal engagement outcome; and
allocate, by the DAP, the first communication configuration to at least one of the one or more exploration sub-groups.

5. The computing system of claim 1, wherein a number of users assigned to the exploitation sub-group and a number of users assigned to the one or more exploration sub-groups are defined by an exploration ratio.

6. The computing system of claim 5, wherein the exploration ratio is based a number of times that engagement outcomes associated with usage of the set of communication configurations have been measured.

7. The computing system of claim 6, wherein the exploration ratio is set to zero when the number of times that engagement outcomes have been measured satisfies a threshold number.

8. The computing system of claim 1, wherein:
each one of the set of communication configurations is defined by a respective one of one or more communication settings, and
each one of the one or more communication settings is defined by a respective communication frequency.

9. The computing system of claim 1, wherein:
each one of the set of communication configurations is defined by a respective one of one or more communication settings, and
each one of the one or more communication settings is defined by a respective communication format for a distinct communication medium.

10. The computing system of claim 1, wherein measuring the engagement outcomes is based on a reward function, the exploitation sub-group exploiting a communication configuration having a highest value of the reward function, and the one or more exploration sub-groups improving knowledge of the set of communication configurations by exploring one or more communication configurations having values of the reward function that are lower than the highest value.

11. A method of optimized delivery of communications including content to users of a software application, the method comprising:
identifying, by a data analytics platform (DAP), a set of communication configurations for communicating with the users of the software application, the users being divided into a plurality of sub-groups;
assigning, by the DAP, a different communication configuration included in the set of communication configurations to each of the plurality of sub-groups;
transmitting, by a customer engagement platform (CEP), one or more communications to each of the users, wherein the one or more communications that are transmitted to a corresponding user are determined based on the content and the corresponding communication configuration for the sub-group that comprises the corresponding user;
measuring, by the DAP, engagement outcomes associated with usage of the corresponding communication configurations in communication with each of the plurality of sub-groups to determine a first communication configuration having an optimal engagement outcome;
allocating, by the DAP, the first communication configuration having the optimal engagement outcome to an exploitation sub-group; and
allocating, by the DAP, one or more communication configurations not having the optimal engagement outcome to one or more exploration sub-groups.

12. The method of claim 11, further comprising transmitting, by the CEP, one or more additional communications to each of the users, wherein the one or more additional communications that are transmitted to a corresponding user are determined based on additional content and either (i) the first communication configuration for the exploitation sub-group that comprises the corresponding user, or (ii) the one or more communication configurations for the one or more exploration sub-groups that comprise the corresponding user.

13. The method of claim 12, further comprising:
measuring additional engagement outcomes associated with usage of the first communication configuration with the exploitation sub-group and usage of the one or more communication configurations with the one or more exploration sub-groups;
identifying, based on the additional engagement outcomes, a second communication configuration included in the one or more communication configurations as having the optimal engagement outcome; and
allocating, by the DAP, the second communication configuration to the exploitation sub-group.

14. The method of claim 13, further comprising:
determining, based on the additional engagement outcomes, that the first communication configuration no longer has the optimal engagement outcome; and
allocating, by the DAP, the first communication configuration to at least one of the one or more exploration sub-groups.

15. The method of claim 11, wherein a number of users assigned to the exploitation sub-group and a number of users assigned to the one or more exploration sub-groups are defined by an exploration ratio.

16. The method of claim 15, wherein the exploration ratio is based a number of times that engagement outcomes associated with usage of the set of communication configurations have been measured.

17. The method of claim 11, wherein:
each one of the set of communication configurations is defined by a respective one of one or more communication settings, and
each one of the one or more communication settings is defined by a respective communication frequency.

18. The method of claim 11, wherein:
each one of the set of communication configurations is defined by a respective one of one or more communication settings, and
each one of the one or more communication settings is defined by a respective communication format for a distinct communication medium.

19. The method of claim 11, wherein measuring the engagement outcomes is based on a reward function, the exploitation sub-group exploiting a communication configuration having a highest value of the reward function, and the one or more exploration sub-groups improving knowledge of the set of communication configurations by exploring one or more communication configurations having values of the reward function that are lower than the highest value.

20. A non-transitory computer readable medium comprising one or more computer-executable instructions for optimized delivery of communications including content to users of a software application, wherein the one or more computer-executable instructions are configured to, when executed by at least one processor of a computing device, cause the computing device to:
identify, by a data analytics platform (DAP), a set of communication configurations for communicating with the users of the software application, the users being divided into a plurality of sub-groups;
assign, by the DAP, a different communication configuration included in the set of communication configurations to each of the plurality of sub-groups;
transmit, by a customer engagement platform (CEP), one or more communications to each of the users, wherein the one or more communications that are transmitted to a corresponding user are determined based on the content and the corresponding communication configuration for the sub-group that comprises the corresponding user;
measure, by the DAP, engagement outcomes associated with usage of the corresponding communication configurations in communication with each of the plurality of sub-groups to determine a first communication configuration having an optimal engagement outcome;
allocate, by the DAP, the first communication configuration having the optimal engagement outcome to an exploitation sub-group; and
allocate, by the DAP, one or more communication configurations not having the optimal engagement outcome to one or more exploration sub-groups.

* * * * *